324-77 CROSS REFERENCE SEARCH ROOM

April 14, 1964 R. BAKIS 3,129,287
SPECIMEN IDENTIFICATION SYSTEM
Filed March 20, 1961 15 Sheets-Sheet 1

INVENTOR
RAIMO BAKIS
BY Francis J. Thomas
ATTORNEY

April 14, 1964 R. BAKIS 3,129,287

SPECIMEN IDENTIFICATION SYSTEM

Filed March 20, 1961 15 Sheets-Sheet 2

April 14, 1964 R. BAKIS 3,129,287

SPECIMEN IDENTIFICATION SYSTEM

Filed March 20, 1961 15 Sheets-Sheet 4

April 14, 1964 R. BAKIS 3,129,287

SPECIMEN IDENTIFICATION SYSTEM

Filed March 20, 1961 15 Sheets-Sheet 7

FIG. 4

| FIG. 4a |
| --- |
| FIG. 4b |

FIG. 4a

SUMMING AMPLIFIER INPUT RESISTANCES *

$\frac{1}{t_2}\int_0^{t_2} \log(1000\frac{P_i}{P_j}+1)dt$

| AMPL. NO. | $\frac{P_1}{P_{tot}}$ | $\frac{P_2}{P_{tot}}$ | $\frac{P_3}{P_{tot}}$ | $\frac{P_4}{P_{tot}}$ | $\frac{P_5}{P_{tot}}$ | $\frac{P_6}{P_{tot}}$ | $\frac{P_7}{P_{tot}}$ | $\frac{P_8}{P_9}$ |
| --- | --- | --- | --- | --- | --- | --- | --- | --- |
| 0-1 | 835 | -182 | 1.35M | 244 | -339 | -79.7 | -187 | 74.1 |
| 0-2 | -2.61M | -80.4 | 592 | 137 | 466 | 761 | -3.59M | 224 |
| 0-3 | 227 | -123 | 606 | 197 | 164 | -213 | -190 | 154 |
| 0-4 | -461 | -159 | 283 | 73.2 | 40.3M | -110 | -105 | 78.9 |
| 0-5 | -316 | -146 | 300 | 47.6 | 142 | -118 | -297 | 83.6 |
| 0-6 | -271 | -161 | 185 | 128 | 547 | -77.2 | -575 | 91.4 |
| 0-7 | -107 | -45.6 | 328 | 66.2 | 193 | -1.80M | 3.25M | 95.5 |
| 0-8 | -285 | -35.5 | 277 | 60.1 | -301 | -1.15M | -1.66M | 73.1 |
| 0-9 | 113 | -1.35M | -400 | 117 | 138M | -128 | -321 | 114 |
| 1-2 | -1.23M | -1.30M | 2.17M | -416 | 147 | 40.4 | 230 | -45.5 |
| 1-3 | 213 | -7.95M | -2.08M | -156 | 72.2 | 1.02M | -940 | -431 |
| 1-4 | -381 | 224 | 2.52M | 222 | 146 | 114 | -285 | -850 |
| 1-5 | -207 | -149 | 248 | 155 | 65.0 | 158 | 473 | 419 |
| 1-6 | -169 | -326 | 191 | -285 | 132 | -403 | 797 | -123 |
| 1-7 | -84.6 | -76.8 | 216 | 244 | 90.6 | 47.8 | 168 | -155 |
| 1-8 | -198 | -63.8 | 326 | -512 | 265 | 95.1 | 198 | -296 |
| 1-9 | 119 | 427 | -222 | -1.06M | 230 | -811 | 268 | -88.5 |
| 2-3 | 194 | 2.32M | -2.13M | 160 | 256 | -124 | -222 | 167 |
| 2-4 | -552 | 96.0 | 2.98M | 378 | -212 | -63.7 | -134 | 52.3 |
| 2-5 | -309 | 806 | 554 | 109 | 4.72M | -69.8 | -380 | 49.9 |

$\frac{1}{t_2^2}\int_0^{t_2} t\cdot\log(1000\frac{P_i}{P_j}+1)dt$

| AMPL. NO. | $\frac{P_1}{P_{tot}}$ | $\frac{P_2}{P_{tot}}$ | $\frac{P_3}{P_{tot}}$ | $\frac{P_4}{P_{tot}}$ | $\frac{P_5}{P_{tot}}$ | $\frac{P_6}{P_{tot}}$ | $\frac{P_7}{P_{tot}}$ | $\frac{P_8}{P_9}$ |
| --- | --- | --- | --- | --- | --- | --- | --- | --- |
| 0-1 | -110 | 148 | -370 | 76.9 | 529 | 31.3 | 92.4 | -26.5 |
| 0-2 | -185 | 13.8 | -109 | -23.6 | -37.7 | -64.7 | 2.23M | -56.7M |
| 0-3 | -36.3 | 20.7 | -162 | -23.0 | -24.0 | 54.6 | 81.0 | -36.4 |
| 0-4 | -113 | 49.7 | -690 | -16.5 | -41.4 | 87.2 | 66.2 | -37.3 |
| 0-5 | 124 | 179 | -38.9 | 16.7 | -83.3 | 47.1 | 113 | -24.0 |
| 0-6 | 357 | 231 | -56.7 | -19.9 | -56.3 | 25.2 | 175 | -24.1 |
| 0-7 | 21.7 | 9.77 | -68.9 | -18.1 | -39.4 | 473 | 1.05M | -32.7 |
| 0-8 | 203 | 6.74 | -60.4 | -8.14 | -27.1 | -700 | 228 | -17.3 |
| 0-9 | -23.2 | -49.2 | 109 | -110 | 360 | 31.3 | 119 | -33.7 |
| 1-2 | 512 | 33.2 | -111 | -93.8 | -22.6 | -8.96 | -111 | 20.2 |
| 1-3 | -41.0 | 45.9 | -280 | -52.9 | -13.1 | 208 | 233 | -152 |
| 1-4 | 8.73M | -393 | 233 | -65.3 | -19.9 | -14.9 | -588 | 40.9 |
| 1-5 | 53.3 | 82.8 | -27.9 | -68.0 | -39.5 | -39.1 | -764 | -160 |
| 1-6 | 50.7 | 138 | -27.4 | -131 | -23.1 | 57.7 | 4.19M | 171 |
| 1-7 | 16.4 | 18.4 | -39.3 | -50.9 | -20.5 | -11.0 | -102 | 94.4 |
| 1-8 | 59.4 | 13.7 | -45.3 | -23.3 | -11.6 | -22.2 | -157 | -80.1 |
| 1-9 | -25.2 | -67.3 | 52.9 | 110 | -562 | 39.5 | -212 | 53.1 |
| 2-3 | -43.0 | -76.4 | 235 | -45.5 | -69.0 | 24.5 | 92.5 | -37.4 |
| 2-4 | -936 | -14.9 | 85.6 | 273 | 101 | 16.5 | 86.5 | -43.0 |
| 2-5 | 68.4 | -25.1 | -47.6 | 317 | 25.2 | 16.4 | 136 | -15.1 |

$\frac{1}{t_2^3}\int_0^{t_2} t^2\cdot\log(1000\frac{P_i}{P_j}+1)dt$

| AMPL. NO. | $\frac{P_1}{P_{tot}}$ | $\frac{P_2}{P_{tot}}$ | $\frac{P_3}{P_{tot}}$ | $\frac{P_4}{P_{tot}}$ | $\frac{P_5}{P_{tot}}$ | $\frac{P_6}{P_{tot}}$ | $\frac{P_8}{P_9}$ | t |
| --- | --- | --- | --- | --- | --- | --- | --- | --- |
| 0-1 | 75.0 | 113 | -396 | 648 | 3.73M | -72.2 | 58.8 | -28.3M |
| 0-2 | 104 | -15.5 | 173 | 28.1 | 39.3 | 63.9 | 98.0 | -11.1M |
| 0-3 | 34.8 | -27.0 | 496 | 36.8 | 26.1 | -82.0 | 56.5 | -24.1M |
| 0-4 | 53.9 | -60.0 | -295 | 18.7 | 31.1 | 487 | 108 | -17.7M |
| 0-5 | -245 | 133 | 38.3 | 31.1 | 93.7 | -411 | 34.5 | -72.9M |
| 0-6 | 201 | 120 | 60.7 | 22.6 | 46.7 | -65.3 | 38.7 | -2.25M |
| 0-7 | -26.8 | -11.3 | 116 | 28.4 | 44.1 | 3.05M | 77.5 | -22.6M |
| 0-8 | 476 | -7.61 | 88.1 | 8.89 | 25.6 | -176 | 23.5 | -3.97M |
| 0-9 | 24.1 | 31.4 | -79.4 | -75.2 | -227 | -45.6 | 68.8 | 12.4M |
| 1-2 | -469 | -26.4 | 77.7 | 54.0 | 24.9 | 10.8 | -54.0 | -9.04M |
| 1-3 | 48.5 | -38.1 | 142 | 51.2 | 14.4 | -129 | 89.0 | -31.5M |
| 1-4 | 234 | -62.8 | -633 | 47.6 | 18.0 | 14.4 | -56.2 | -20.3M |
| 1-5 | -56.0 | -333 | 23.1 | 88.4 | 46.5 | 35.5 | 146 | 48.6M |
| 1-6 | -64.1 | -156 | 220 | 60.9 | 23.0 | -90.1 | 99.1 | -908 |
| 1-7 | -17.9 | -22.4 | 41.5 | 56.3 | 24.0 | 12.5 | -629 | -34.7M |
| 1-8 | -72.1 | -16.8 | 39.6 | 22.3 | 11.8 | 26.6 | 40.4 | -2.22M |
| 1-9 | 29.3 | 75.9 | -64.9 | -112 | -140 | -34.6 | -174 | 5.27M |
| 2-3 | 51.2 | 61.5 | -189 | 90.7 | 89.7 | -29.0 | 54.7 | 46.0M |
| 2-4 | 170 | 16.6 | -71.7 | -184 | 219 | -21.4 | -877 | 19.6M |
| 2-5 | -73.7 | 20.1 | 37.2 | -40.3 | -24.8 | -24.4 | 18.7 | 11.3M |

| | | | | | | | | | | | | | | | | | | | | | | | | |
|---|---|---|---|---|---|---|---|---|---|---|---|---|---|---|---|---|---|---|---|---|---|---|---|---|
| 2-6 | -230 | 115 | 36.8M | -376 | -137 | -48.5 | -695 | 65.1 | 71.8 | -12.8 | -198 | 61.1 | 32.3 | 11.7 | 196 | -17.8 | -105 | 11.9 | 80.1 | -66.3 | -44.5 | -17.0 | 28.4 | -1.99M |
| 2-7 | -100 | -125 | 417 | 120 | -10.6M | -103 | 1.68M | 65.7 | 19.1 | 61.1 | -162 | -78.1 | 87.9 | 15.5 | 2.66M | -27.1 | -21.5 | -171 | 827 | -469 | -72.9 | -16.1 | 87.7 | 17.8M |
| 2-8 | -284 | -71.5 | 410 | 129 | -207 | -247 | -8.34M | 43.3 | 79.4 | 19.9 | -113 | -23.1 | 337 | 53.3 | 299 | -9.49 | -107 | -27.0 | 156 | 27.0 | 313 | -69.4 | 11.7 | -4.76M |
| 2-9 | 118 | 149 | -262 | 400 | -348 | -55.9 | -453 | 90.2 | -27.5 | -16.8 | 48.4 | 40.6 | 26.7 | -10.3 | 153 | -30.4 | 32.6 | 157 | -47.7 | -24.8 | -26.3 | -11.6 | 72.8 | 4.46M |
| 3-4 | -112 | 161 | 2.28M | 262 | -92.6 | 1.17M | 1.27M | 2.03M | 33.2 | -24.4 | 145 | 44.4 | 34.4 | -50.7 | -1.47 | 60.7 | -50.1 | 33.4 | -121 | -65.8 | -126 | 42.8 | -55.3 | 143M |
| 3-5 | -129 | -662 | 478 | 198 | -94.0 | 1.77M | 430 | 623 | -27.8 | -43.7 | -39.5 | 63.1 | 10.9 | -84.2 | -195 | 122 | -31.0 | 31.1 | 30.7 | -44.9 | -11.1 | 62.1 | -92.2 | 28.6M |
| 3-6 | -91.8 | 288 | -3.56M | -158 | -57.5 | -464 | 731 | -590 | 21.9 | -21.9 | -80.5 | 31.8 | 13.2 | 220 | -418 | 110 | -26.4 | 20.4 | 43.3 | -53.2 | -16.7 | 614 | -133 | -3.86M |
| 3-7 | -70.4 | -91.4 | 261 | 260 | -140 | 181 | 185 | -20.0M | 13.9 | 29.3 | -70.0 | 116 | 24.2 | -37.5 | -86.2 | 99.1 | -15.8 | -41.0 | 104 | -81.5 | -26.3 | 43.7 | -90.6 | 77.4M |
| 3-8 | -108 | -62.8 | 319 | -408 | -77.9 | 208 | 190 | -715 | 25.6 | 15.7 | -67.7 | 481 | 29.2 | -42.0 | -110 | 171 | -31.2 | -19.5 | 74.4 | -15.0M | -48.4 | 46.3 | -195 | -7.30M |
| 3-9 | 302 | 191 | -285 | -5.40M | -106 | -1.33M | 245 | -566 | -97.8 | -21.4 | 54.0 | 34.1 | 15.9 | 294 | -121 | 67.0 | 139 | 20.7 | -55.9 | -33.1 | -17.0 | -345 | -72.1 | 8.84M |
| 4-5 | -342 | -217 | 640 | 869 | 573 | 343 | 197 | 199 | 46.3 | -210 | -28.2 | 340 | -18.8 | 80.8 | -2.92M | -20.0 | -42.4 | 54.6 | 22.8 | -22.6 | -15.5 | -78.6 | 21.0 | 20.6M |
| 4-6 | -196 | -732 | 706 | -115 | -3.20M | -212 | 403 | -665 | 37.3 | -54.8 | -29.5 | 41.1 | 36.0 | 22.9 | 987 | -39.9 | -39.1 | 31.8 | 21.4 | -46.6 | -25.2 | -23.8 | 30.0 | -1.57 M |
| 4-7 | -88.9 | -47.3 | 223 | 247 | 87.9 | 148 | 93.0 | -273 | 14.5 | -9.73 | -33.7 | -76.2 | -187 | 1.06M | -74.3 | -105 | -15.2 | -11.4 | 39.0 | 396 | -40.4 | -95.6 | 89.0 | 90.2M |
| 4-8 | -330 | -33.5 | 373 | 112 | -44.5M | 170 | 141 | 123 | 49.9 | 6.23 | -38.3 | -99.4 | -85.9 | -58.8 | -125 | -14.1 | -48.5 | -7.08 | 37.8 | 10.4 | -199 | 101 | 13.1 | -3.47M |
| 4-9 | 79.1 | 493 | -167 | -180 | 223 | -147 | 153 | -126 | -21.4 | -32.8 | 61.8 | 22.0 | 35.7 | 15.0 | -177 | -142 | 28.1 | 23.8 | -69.3 | -18.0 | -20.3 | -14.1 | 75.4 | 5.35 M |
| 5-6 | 2.60M | 261 | -444 | -89.6 | 257 | -234 | 132 M | -266 | -116 | -272 | 32.9 | -4.38M | -24.5 | 36.0 | 1.07M | -471 | 91.3 | -276 | -29.7 | 40.3 | 21.0 | -40.2 | 123 | -1.85 M |
| 5-7 | -174 | -112 | -338 | 905 | 157 | 143 | 271 | -183 | 27.4 | 16.3 | 33.1 | -46.3 | -22.9 | -46.0 | -126 | 94.1 | -30.3 | -16.2 | -26.2 | 42.6 | 23.2 | 105 | -137 | -28.8M |
| 5-8 | 1.59M | -86.8 | 5.25M | 57.5 | -606 | 145 | 288 | 580 | -180 | -11.9 | 57.1 | -6.57 | -6.86 | -43.2 | -213 | -34.3 | 145 | -11.7 | -36.8 | 6.27 | 6.63 | 69.5 | 29.4 | -3.52M |
| 5-9 | 87.1 | 117 | -221 | -82.4 | -123 | -236 | 604 | -93.9 | -19.8 | -35.2 | 30.0 | 20.8 | 40.6 | 27.9 | -352 | 43.1 | 22.0 | 49.2 | -25.6 | -24.6 | -41.2 | -24.3 | -55.7 | 8.97 M |
| 6-7 | -107 | -43.0 | -468 | 85.4 | 68.0 | 74.0 | 502 | 327 | 16.4 | 7.79 | 50.7 | -33.7 | -27.1 | -17.0 | -190 | 383 | -16.9 | -8.28 | -34.4 | 77.7 | 90.0 | 23.2 | -102 | 1.83 M |
| 6-8 | 1.78M | -31.0 | 155 | 45.7 | 62.3 | 92.3 | 426 | 405 | 608 | 5.29 | -77.6 | -7.23 | -10.8 | -23.0 | -283 | -75.7 | -328 | -5.56 | -190 | 7.62 | 11.5 | 31.5 | 90.1 | 3.12 M |
| 6-9 | 62.9 | 149 | -174 | 418 | 1.14 M | 606 | 1.00 M | -636 | -14.2 | -30.3 | 32.7 | 32.4 | 40.8 | -11.1M | -400 | 61.0 | 16.3 | 31.9 | -26.7 | -20.4 | -25.5 | -123 | -56.6 | 1.20 M |
| 7-8 | 129 | -202 | -4.73M | 1.77 M | -153 | 577 | -2.08M | 3.32M | -20.4 | 25.0 | -196 | -25.6 | 56.4 | -79.4 | 293 | -60.1 | 21.7 | -24.3 | 104 | 22.8 | 24.8 | 69.6 | 47.9 | -3.79M |
| 7-9 | 55.3 | 60.0 | -139 | -121 | -130 | -64.9 | -319 | -244 | -11.0 | -12.0 | 30.1 | 22.8 | 24.2 | 12.1 | 140 | 127 | 12.3 | 13.4 | -34.9 | -24.8 | -26.0 | -13.0 | -361 | 6.33 M |
| 8-9 | 74.3 | 51.6 | -156 | -98.9 | 200 | -105 | -426 | -165 | -17.7 | -9.65 | 32.8 | 10.6 | 18.3 | 20.4 | 338 | 24.8 | 20.6 | 10.7 | -34.9 | -10.3 | -15.2 | -22.1 | -25.3 | 2.11M |

* ALL VALUES IN KILOHMS UNLESS OTHERWISE INDICATED. TOLERANCE = 1 %

FIG. 4b

April 14, 1964 R. BAKIS 3,129,287

SPECIMEN IDENTIFICATION SYSTEM

Filed March 20, 1961 15 Sheets-Sheet 10

BAND-PASS FILTER

LOW-PASS FILTER

FUNCTION GENERATOR

DETECTOR (SQUARE LAW)

$$E_o = -R\left[\sum_{i=1}^{n} \frac{E_i}{R_i} + \frac{E_{ref.}}{R_{ref.}}\right]$$

SUMMING AMPLIFIER (LIMITED OUTPUT)

INTEGRATOR $$E_o = -\frac{1}{RC}\int E_i \, dt$$

SPECIMEN IDENTIFICATION SYSTEM

Filed March 20, 1961 15 Sheets-Sheet 14

April 14, 1964 R. BAKIS 3,129,287

SPECIMEN IDENTIFICATION SYSTEM

Filed March 20, 1961 15 Sheets-Sheet 15

United States Patent Office 3,129,287 Patented Apr. 14, 1964

3,129,287

SPECIMEN IDENTIFICATION SYSTEM

Raimo Bakis, Ossining, N.Y., assignor to International Business Machines Corporation, New York, N.Y., a corporation of New York Filed Mar. 20, 1961, Ser. No. 97,010
13 Claims. (Cl. 179—1)

Figure 1:
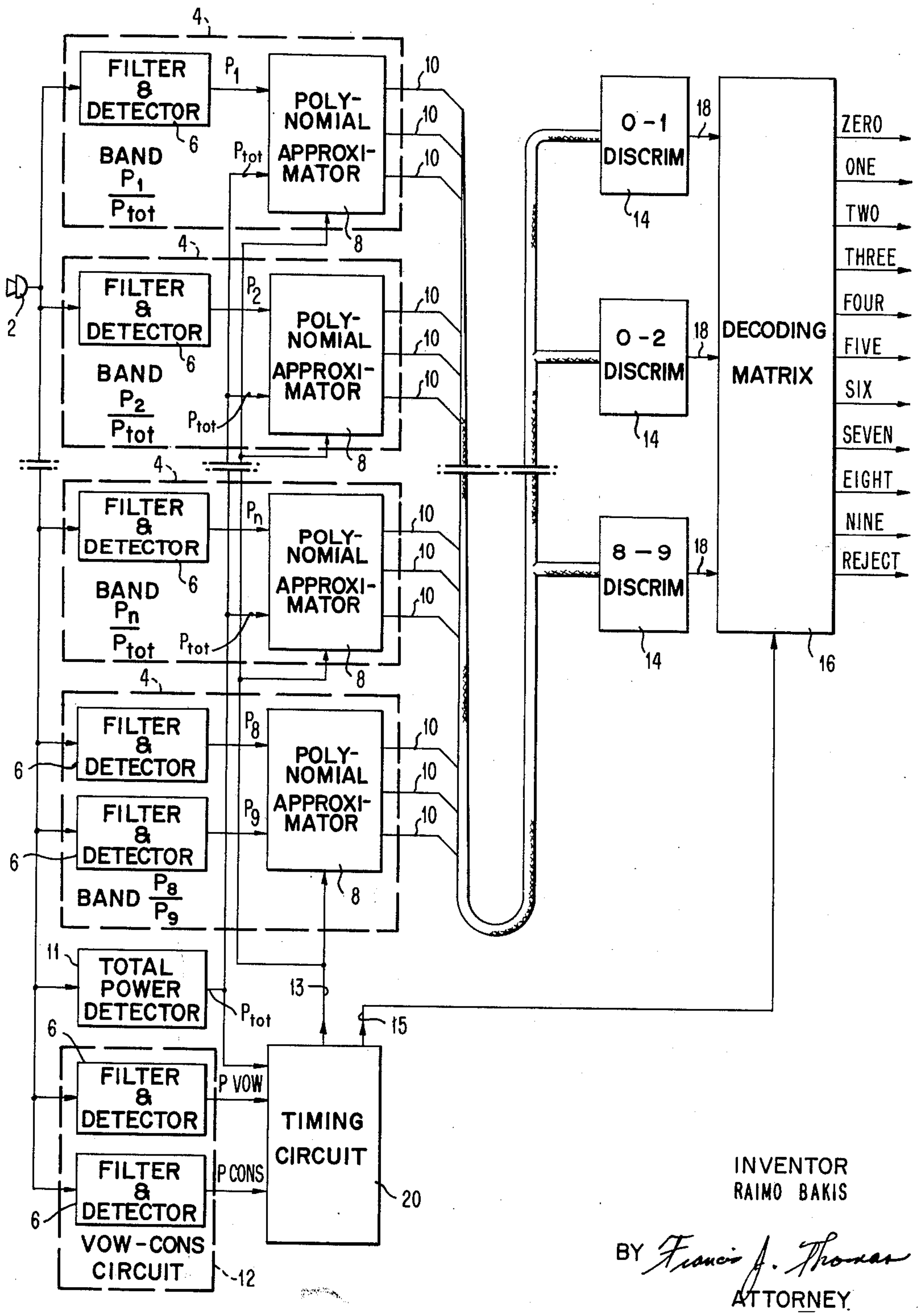

This invention relates to methods and apparatus for identifying specimens making use of techniques of function approximation. These techniques are particularly shown with respect to a system for identifying speech.

The electrical representation of speech that is generated by a microphone is relatively complicated and presents a difficult identification problem. Speech identification devices in the prior art generally make use of measurements of the specimen power in various frequency bands and compare these measurements with reference power measurements. There are many variable speech characteristics introduced by the speaker such as speech speed, pitch, accent and other minor irregularities which adversely affect the operation of these devices. It is the essence of this invention to provide identification of speech specimens by analyzing the significant changes of sound in the specimen while disregarding other characteristics. This is accomplished by determining approximating functions of the specimen data and using these functions, rather than the specimen data itself, to control the identification of the specimen. The particular approximating functions that form the basis of the preferred embodiment of the invention are functions of the coefficients of the second-order polynomials that define the parabolae that most closely approximate the specimen data.

These techniques of function approximation permit the identification of irregular specimens without hampering accuracy. When tested with a group of speakers uttering the ten spoken digits, the system provided a correct identification for 94% of the specimen utterances and a reject indication for 1% of the utterances. An incorrect identification was made for 5% of the utterances. None of the speakers used to establish the system parameters were included in this test.

A text by Claude Merton Wise entitled Applied Phonetics, 1957, is a source of background information in the field of speech. This book is published by Prentice-Hall, Inc. and has a Library of Congress Catalog Card No. 57–9721.

The present invention is embodied in a system for identifying the ten spoken digits based on the "vowel" content of the specimen, where the word "vowel" is loosely used to refer to the relatively low frequency sounds in the specimen. In this embodiment, functions of the coefficients of the second-order polynomials that define the parabolae that most closely approximate logarithmic functions of the ratio of the power in pairs of bands of frequencies are determined. These functions form the basis for identifying the specimen. Although the invention is embodied in a specific speech identification device, it may be seen to be readily applicable to the identification of other specimens. In particular, many physical phenomena (such as heart-beats, earthquakes, etc.) may be readily converted into time-varying electrical signals, and the approximating technique taught herein may be practiced to identify characteristics of the phenomena.

One object of this invention is to show methods and apparatus for identifying a specimen which utilize functions of the specimens which have a relatively low dependence upon those characteristics of the specimen which are relatively low in discriminating value.

A further object is to teach methods and apparatus for identifying a specimen which utilize functions of integral functions and of parameters derivable from the specimen as the basis for identification, where the utilized functions have a relatively low dependence upon the characteristics of the specimen which are relatively low in discriminating value.

Another object of this invention is to teach the use of function approximation in a specimen identification system.

An object of this invention is to improve specimen identification systems by utilizing techniques of polynomial approximation to indicate functions of the coefficients of the polynomials which most closely approximate various specimen data and providing an indication of the identity of the specimen based on the functions rather than on the specimen data itself.

A more particular object is to show the use of techniques of polynomial approximation to identify a time-varying, analog speech specimen.

A further object is to show a method and apparatus for the identification of a speech specimen making use of functions of the coefficients of an approximating polynomial for each of several bands of frequencies contained in the specimen as the basis of the identification.

The foregoing and other objects, features and advantages of the invention will be apparent from the following description of a preferred embodiment of a speech identification system.

An analog, time-varying electrical signal, which is representative of the speech specimen to be identified, is generated by a microphone. This signal is applied to a group of filters, each of which passes a component of the signal within a particular band of frequencies. The outputs of the filters are applied to square-law detectors which generate signals that are representative of the powers in the various bands. An additional signal is generated that represents the total speech specimen power.

Various pairs of these signals are applied to polynomial approximator circuits, each of which generates output signals that are indicative of functions of the coefficients of a polynomial that approximates the logarithm of the ratio of the two applied signals. In the embodiment to be described in detail below, each polynomial approximator develops three output signals which define a second-order (quadratic) polynomial. The polynomial thus defined is determined by the parabola that most closely approximates the shape of the curve representing the logarithm of the ratio of the signals applied to the polynomial approximator.

The output signals from each polynomial approximator are applied to each of a group of discriminators. One discriminator is required for each pair of reference words. Thus forty-five discriminators are required in the embodiment to be described because ten words (spoken digits) are to be identified. Each discriminator has a binary output indicating which spoken digit, of the pair of digits between which it is designed to discriminate, most closely approximates the specimen. A decoding matrix utilizes the outputs of the disciriminators to finally determine the identity of the specimen. A reject circuit provides an indication if the specimen is not similar to any reference.

Although this invention is embodied in a speech identification system using polynomial approximation techniques, it is not meant to be so limited. Many approximating functions are available that would enhance the identification of a variety of types of specimens, including speech specimens.

A more particular description of the preferred embodiment of the invention is based on the accompanying drawings.

In the drawings:

FIGURE 1 is a block diagram of a speech identification embodiment of the invention.

FIGURES 2*a* through 2*d* are diagrams providing data on the spoken digits "one" and "two."

Figures 3, 3A:
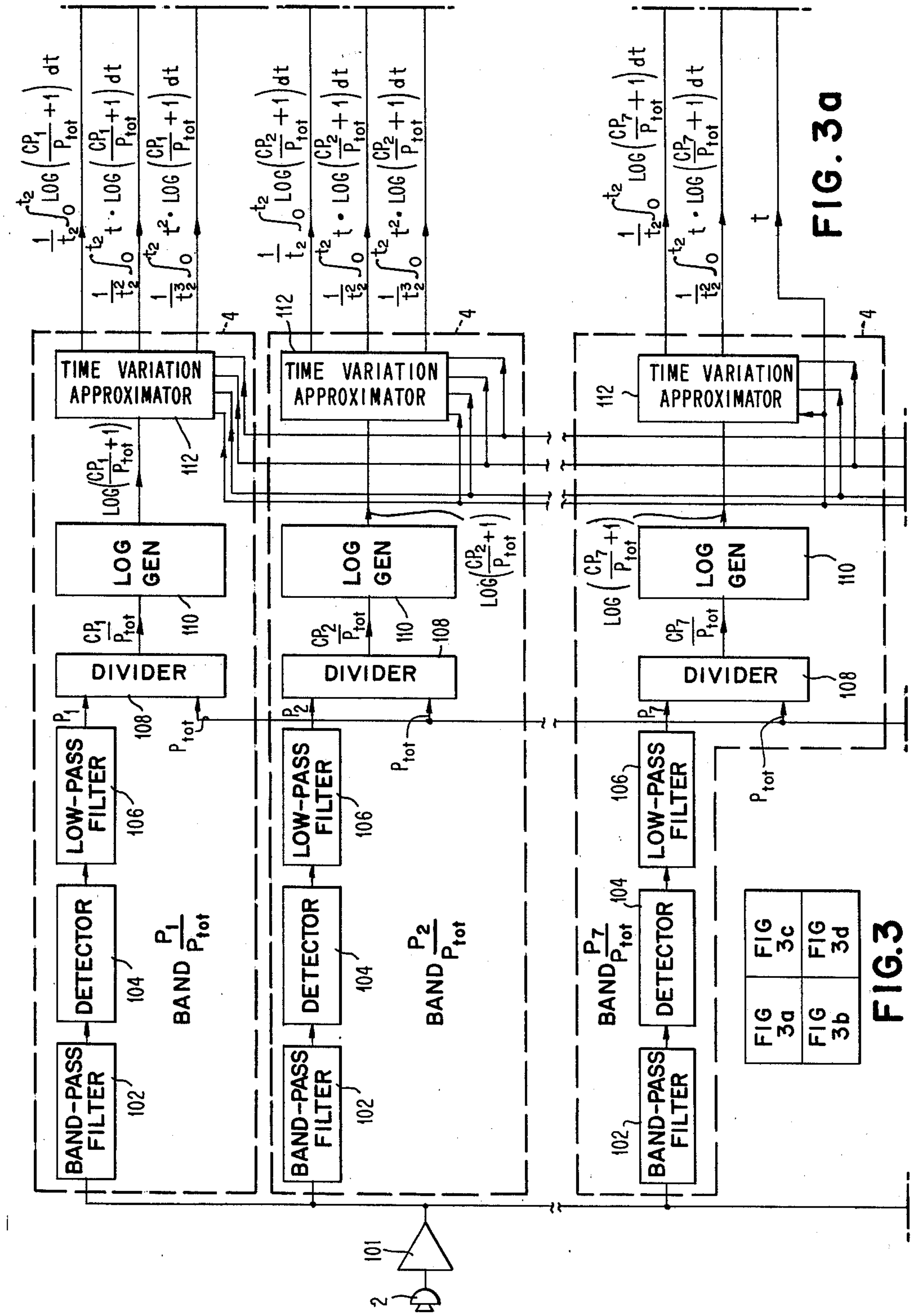
Figure 3B:
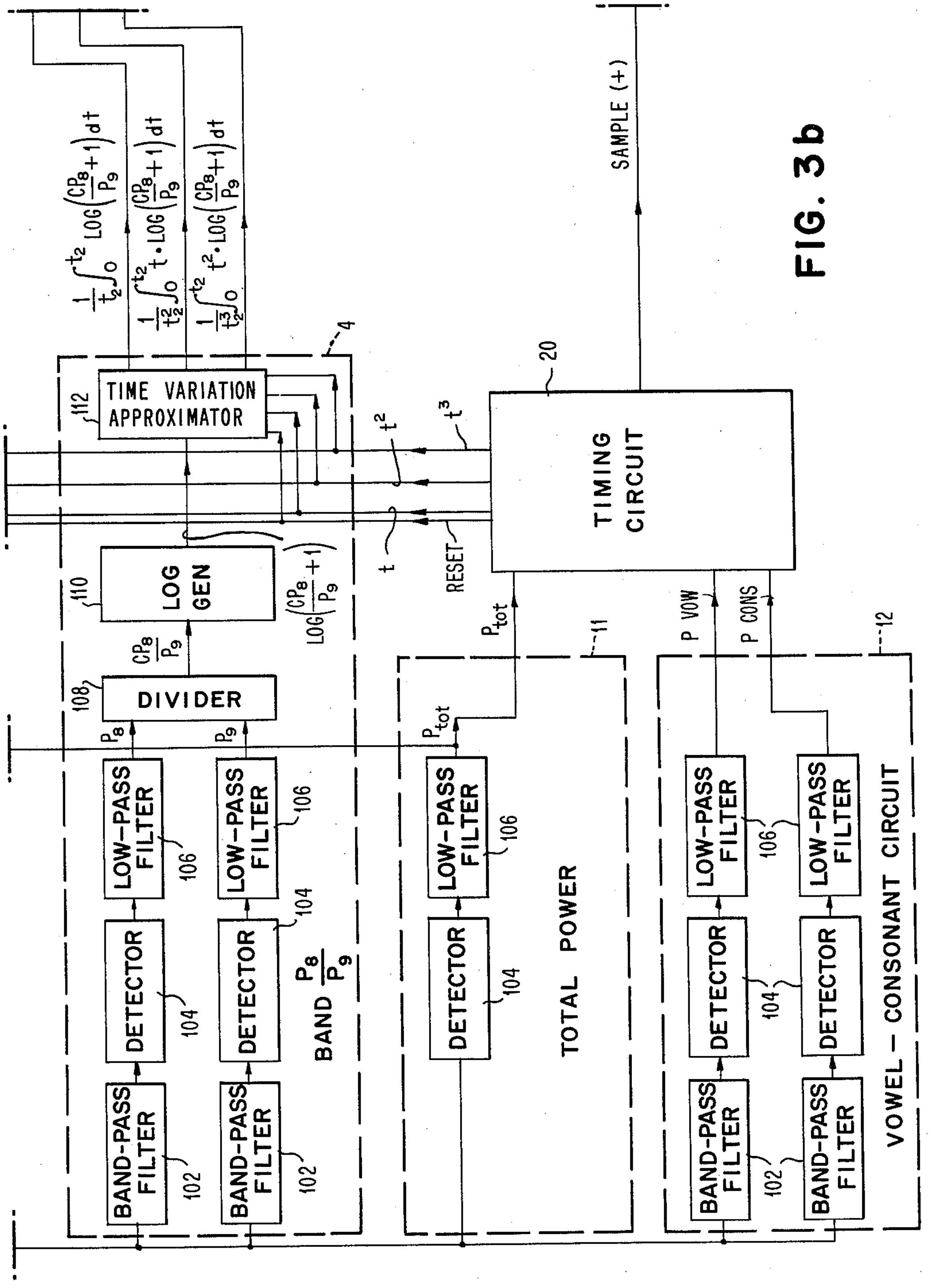
Figure 3C:
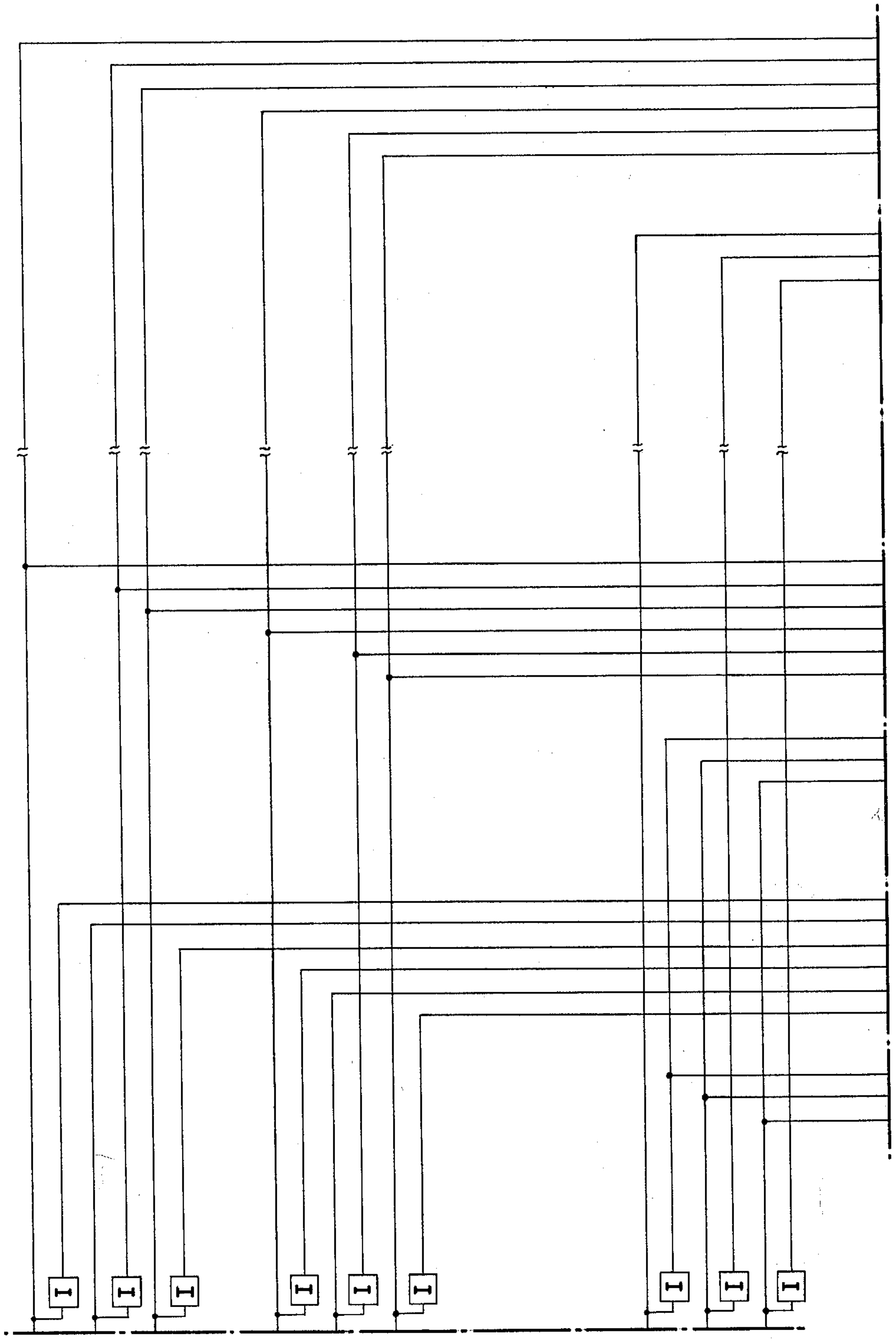

FIGURE 3 which comprises FIGURES 3*a* through 3*d* is a schematic diagram of a speech identification embodiment of the invention.

FIGURE 4 which comprises FIGURES 4*a* through 4*b* is a chart indicating the discriminator parameters.

Figures 5, 5A:
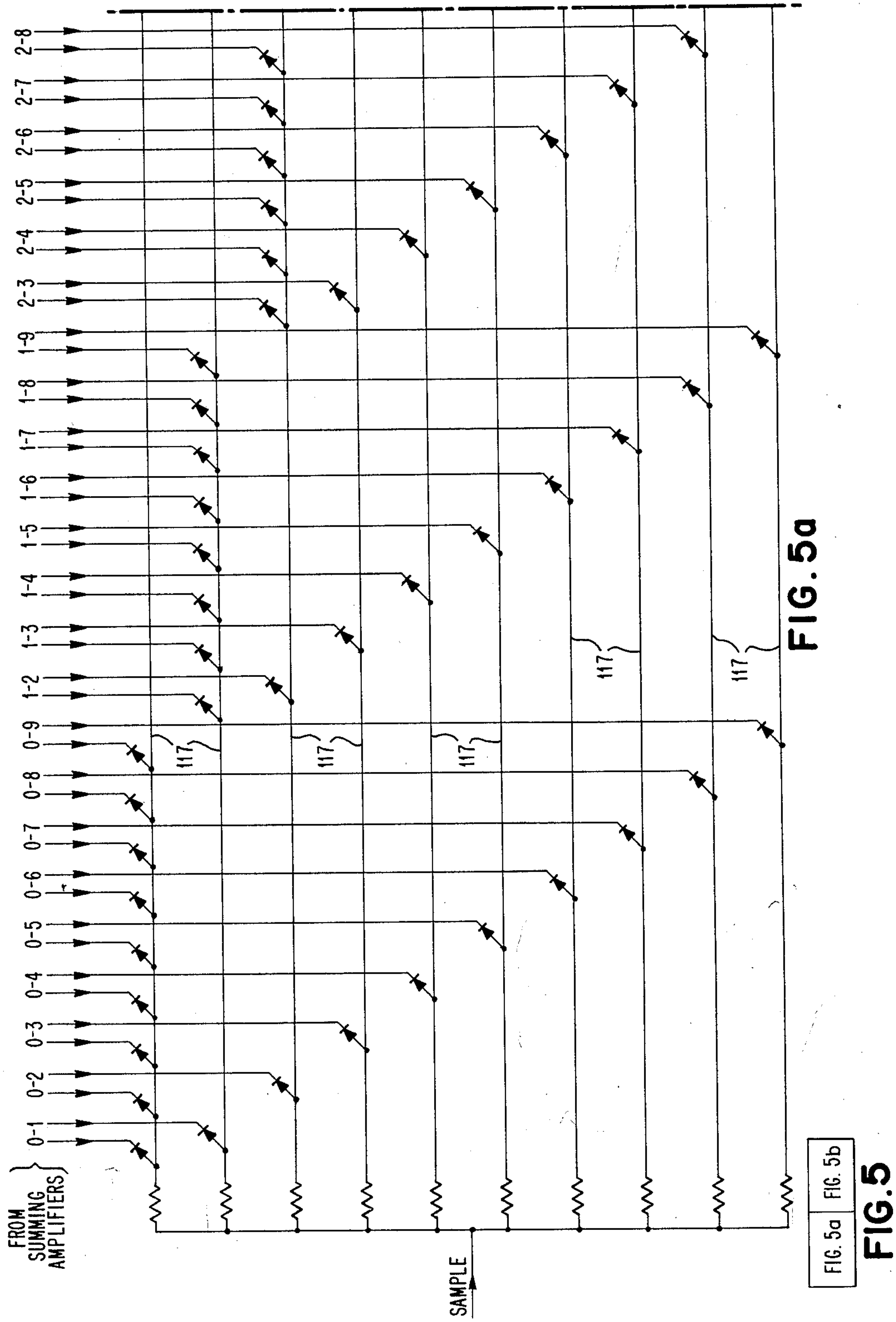
Figure 5B:
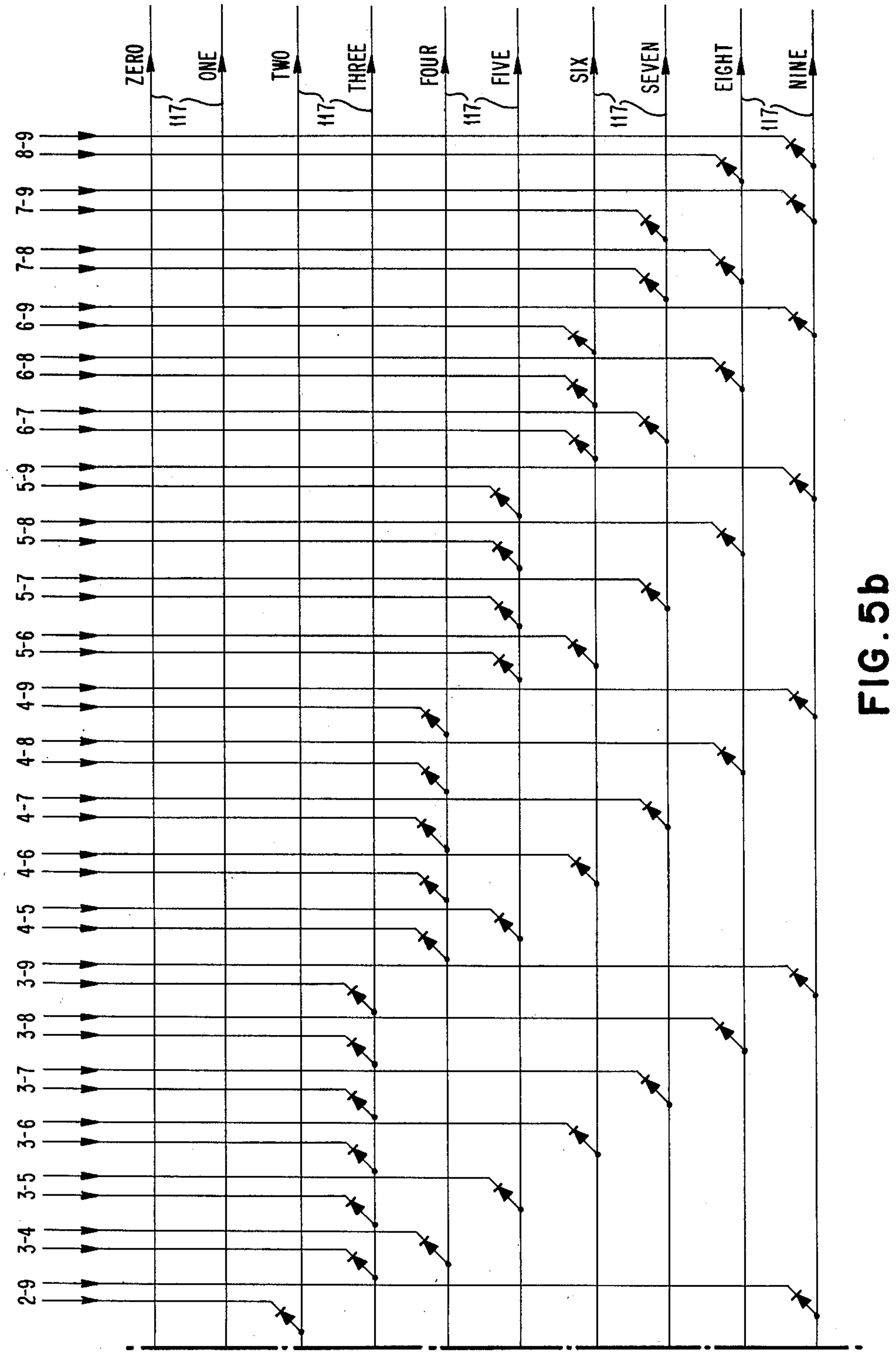

FIGURE 5 which comprises FIGURES 5*a* through 5*b* is a detailed diagram of the decoding matrix shown in abbreviated form in FIGURE 3.

FIGURES 6 through 13 are detailed diagrams of portions of the system shown in block form in FIGURE 3.

A preferred embodiment of a specimen identification system using techniques of polynomial approximation is shown in FIGURE 1. This system identifies the ten spoken digits "zero" through "nine." The speech input specimen is applied to a microphone 2 which generates a time-varying electrical wave form. A group of band circuits 4, each containing one or more filter and detector circuits 6 and a polynomial approximator 8 utilize the microphone output to generate groups of approximating polynomial identifying indicia on leads 10. Each filter and detector circuit 6 produces an output signal indicative of the amount of power in a particular band of frequencies, as determined by the electrical properties of the filter. The polynomial approximator circuits 8, in several of the band circuits 4, have a second input indicative of the total power of the speech signal ($P_{tot}$) as developed by a total power circuit 11. One of the band circuits, the band $P_8/P_9$ circuit, does not utilize the total power signal, but rather, has two filter and detector circuits 6 because it has been found that the ratio of the powers in some pairs of frequency bands contains highly-discriminating data that is valuable in the identification of speech. The polynomial approximators 8 successively perform the following operations on their input signals: the ratio of one input signal to the other is determined; the natural logarithm of this ratio is computed; and output indicia determinative of the second-order polynomial most closely approximating the logarithm of the ratio of the input signals are generated on leads 10.

A vowel-consonant circuit 12 containing two filter and detector circuits 6 produces output signals indicative of the amount of "vowel" power and the amount of "consonant" power in the speech specimen. This is accomplished by measuring the power in the relatively low frequencies ("vowel") and the power in the relatively high frequencies ("consonant"). These signals and the total power signal are applied to a timing circuit 20 which generates several outputs (shown as a single lead 13) which are applied to each polynomial approximator 8. These signals are dependent upon the duration of the "vowel" portion of the speech specimen. While the entire speech specimen could be used as a basis for identifying the specimen, it has been found that use of only the "vowel" portion of the specimen is adequate.

Each polynomial approximator output signal is applied to each of a group of discriminators 14. These signals are linearly-combined (weighted and added) to generate a binary output signal on a lead 18. The weights assigned to each input in each discriminator are determined by the two reference digits between which the circuit is to discriminate. A binary output is generated which is indicative of the digit that the speech specimen most closely approximates. For example, the 8–9 discriminator provides an output indicating whether the input speech specimen more closely approximates an "8" or more closely approximates a "9." This determination is made by the 8–0 discriminator even if the specimen is neither an "8" or a "9." There are 45 discriminators in the embodiment to provide discrimination with respect to each pair of digits within the ten digits.

A decoding matrix 16 analyzes the binary signals generated by the discriminators and provides an indication of the identity of the specimen upon the occurrence of a signal on a lead 15 from the timing circuit 20.

The basic concept underlying this embodiment is to be described with respect to the spoken digits "one" and "two." This description could obviously be extended to cover the remaining eight spoken numerals as well as any other specimens. The purpose of the following description is to provide an insight into the mathematics underlying the technique and to show a method of ultimately determining the weights to be assigned in the discriminators. Sample discriminator component values are given in detail with respect to the embodiment but, since they depend upon the reference words, they must be changed if the invention is to be used for identifying spoken words other than the ten digits or if the ten digits are spoken by one whose speech is radically different from that of the group of speakers who were used in the establishment of the parameters (discriminator weights).

Figures 2A, 2B:
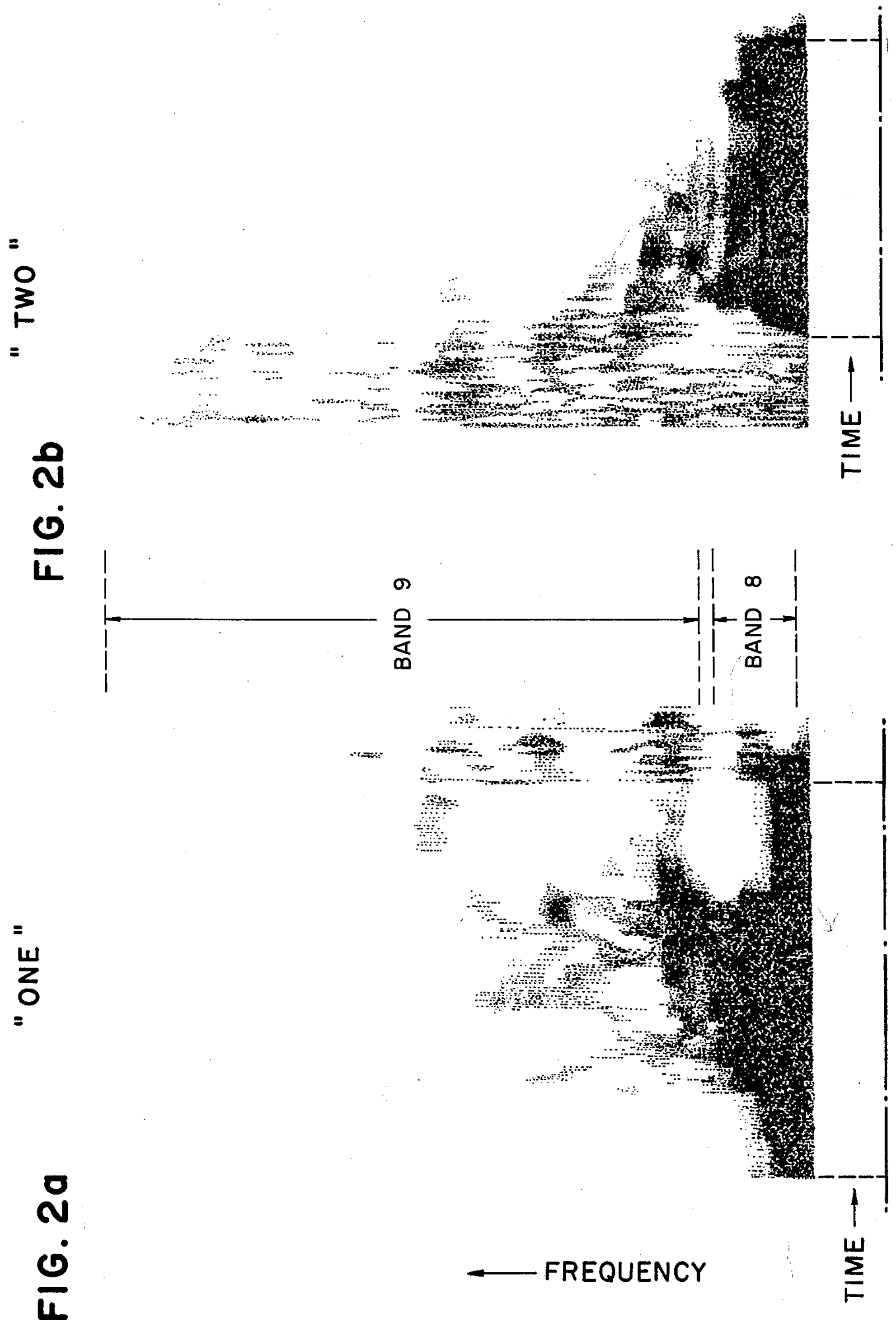

FIGURES 2*a*–2*b* are sound spectrograms of the spoken digits "one" and "two" respectively. Time is plotted along the horizontal axis, and frequency is plotted vertically. The intensity of the spectrogram is indicative of signal power, where a dark area indicates a higher power than is indicated by a light area. This method of graphically presenting a speech specimen is described in detail in a text authored by Ralph K. Potter, George A. Kopp and Harriet C. Green entitled Visible Speech, 1947, published by the D. Van Nostrand Co., Inc., New York.

Figure 2D:
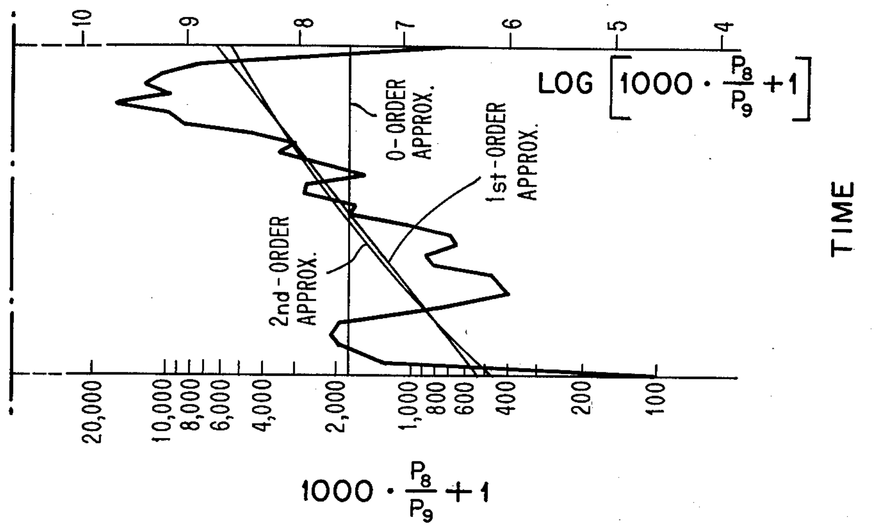
Figure 2C:
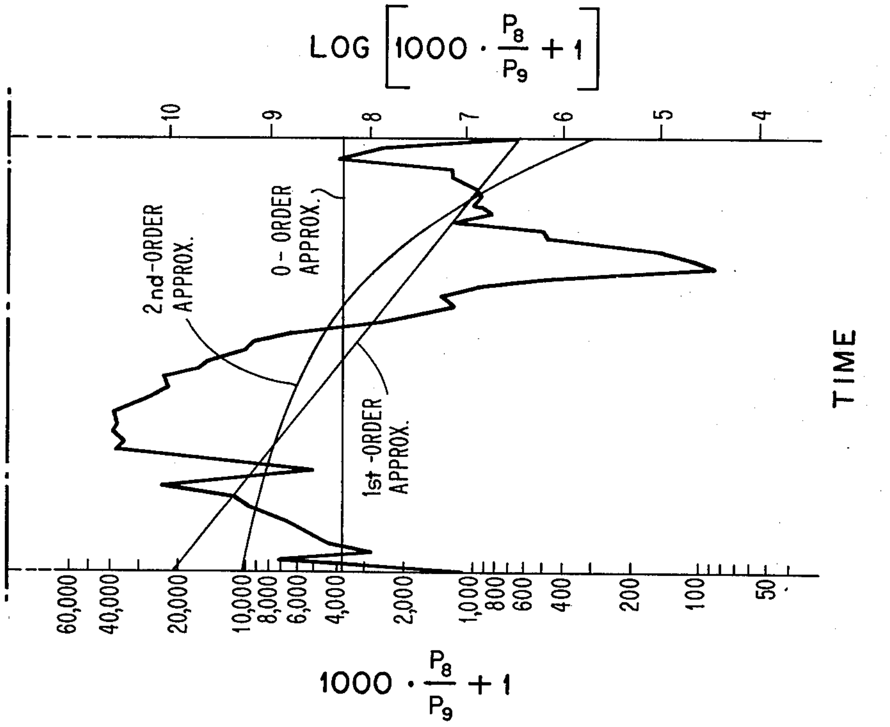

The vertical coordinate is further labelled to indicate the relative frequency ranges of the two filter and detector circuits 6 (FIG. 1) in the band $P_8/P_9$ circuit 4. The sample calculations that follow are based on this circuit but could be obviously extended to include all of the band circuits. The vertical dotted lines encompass the time during which the sounds are predominantly "vowel." These lines are carried across to FIGURES 2*c* and 2*d* on a separate sheet, to permit FIGURES 2*a* and 2*c* and FIGURES 2*b* and 2*d* to be analyzed together. FIGURES 2*c* and 2*d* are graphic representations of the relative powers $P_8$ and $P_9$ in two bands of frequencies during the "vowel" portion of the specimen.

The identification of specimens is enhanced by the use of approximating functions of the type that retain the discriminating characteristics of the specimens while disregarding other characteristics such as speech irregularities, rate of speaking, loudness, etc.

Functions of the type $P_i/P_j$ are descriptive of the speech sounds producing them and convenient for use in a specimen identification system. Experiment has shown that, in the embodiment to be described, logarithmic functions of these power ratios provide greater discrimination than is obtained using the power ratios directly. For this reason, the vertical scale of the graphs in FIGURES 2*c* and 2*d* are linearly ruled according to the logarithmic function:

$$\log\left[1000\frac{P_8}{P_9}+1\right]$$

The quantity "1" is added to insure that all logarithms are positive. A factor of "1000" is used to minimize the effect of the added "1."

Since the phonetic content of a speech sound depends not only on the instantaneous characteristics of the sound at any one instant, but also on the way the sound changes, such quantities as the time-derivatives of these functions might be considered useful for identification. However, in addition to the significant changes in sound (which the human hears), there are many small irregularities which make the instantaneous value of the time derivative (of the function) inadequate. Consider the "vowel" portion of the function $P_8/P_9$ for the spoken digit "two" as plotted in FIGURE 2*d*. The general trend of the function is an increase with time, corresponding to the changing quality of the "*u*" sound as the tongue is gradually lowered from the position it had when the "*t*" was being pronounced. For short periods of time, however, the function actually decreases. These short-term fluctuations appear to be of little significance in the identification of speech specimens. For this reason, it is expedient to approximate the actual functions with smooth, slowly-varying approximating functions, and to use these functions for identification.

Three approximating functions are shown in FIGURES 2*c* and 2*d*. The 0-order function is a horizontal line having a polynomial expression of the type $P=C$, where C is a constant. The 1st order approximating function is a straight line having a polynomial expression of the type: $P=C_1t+C_2$. Similarly, the 2nd-order approximating function is a parabola having a polynomial expression of the type $P=C_1t^2+C_2t+C_3$.

A well-known method of approximating functions is to expand them in a series of orthogonal functions, and to truncate this series, using only the first few terms. This procedure is described in a reference entitled Fourier Series and Boundary Value Problems, by Ruel V. Churchill, McGraw Hill, 1941 in pages 39–41. Let $\psi_i(x)$ with $i=1, 2, \ldots$ be a series of orthogal functions. Then a function $f(x)$ can be approximated (page 41, theorem 1 of the Churchill reference) in an interval $(x_1, x_2)$ by:

$$f(x)\approx\sum_{i=0}^{n}a_i\psi_i(x) \qquad (1)$$

where:

$$a_i=\frac{\int_{x_1}^{x_2}\psi_i(x)\cdot f(x)dx}{\int_{x_1}^{x_2}\psi_i^2(x)dx} \qquad (2)$$

The particular orthogonal functions used with respect to the embodiment to be described are polynomials, orthogonal over the interval (0, 1). The first three of these functions are:

$$\begin{aligned}\psi_0(x)&=1\\ \psi_1(x)&=1+2x \qquad (3)\\ \psi_2(x)&=1-6x+6x^2\end{aligned}$$

Since all speakers do not always speak at the same rate, a set of functions which are orthogonal over the duration of one utterance of a word may not be suitable for another utterance having a different duration. For this reason the actual duration *t*, was not used as the argument for the orthogonal functions, but rather a "normalized" time *x*. The relationship between *x* and *t* is:

$$x=\frac{t-t_1}{t_2-t_1} \qquad (4)$$

where $t_1$ is the value of *t* at the start of the speech event, and $t_2$ the value at the end of the event. Thus *x* always has a value in the range from 0 to 1, as required for the functions given in (3).

The formulae for the coefficients $a_i$ can now be obtained by substituting the expression for $\psi_i$ from (3) into (2).

$$a_0=\frac{\int_0^1 f(x)dx}{1}$$

$$a_1=\frac{\int_0^1 f(x)(1-2x)dx}{1/3} \qquad (5)$$

$$a_2=\frac{\int_0^1 f(x)(1-6x+6x^2)d}{1/5}$$

These numbers ($a_0$, $a_1$ and $a_2$), if substituted into Equation 1, define the approximating curves shown in FIGURES 2*c* and 2*d*, where $$f(x)=\log\left[1000\frac{P_8}{P_9}+1\right]$$

Thus, the $a_i$ functions provide information about the gross characteristics of the original functions $f(x)$ while ignoring detailed irregularities which are of less significance for identification. In particular: $a_0$ is the average value of the function and is indicated as the 0-order approximating function; *al* is related to the slope of the function, or more precisely to the slope of a straight line approximating the function (1st order approximating function); and $a_2$ is related to the curvature of a parabola approximating the function (2nd order approximating function).

If the polynomial approximators 8 shown in FIGURE 1 generated the $a_i$ functions, then the only mathematical problem faced would be that of determining the weights $\alpha_i$ to be used in each discriminator 14 for each function $a_i$. The polynomial approximators however, generate functions of the $a_i$ functions, rather than the $a_i$ functions themselves. This is done to simplify the structure of the polynomial approximator circuits, at the expense of complicating the computation of the discriminator weights. Each polynomial approximator is designed to generate the following three functions $I_i$:

$$\begin{aligned}I_0&=\frac{1}{t_2-t_1}\int_{t_1}^{t_2}g(t)dt\\ I_1&=\frac{1}{(t_2-t_1)^2}\int_{t_1}^{t_2}g(t)(t-t_1)dt \qquad (6)\\ I_2&=\frac{1}{(t_2-t_1)^3}\int_{t_1}^{t_2}g(t)(t-t_1)^2dt\end{aligned}$$

where $$g(t)=f\left(\frac{t-t_1}{t_2-t_1}\right) \qquad (7)$$

These functions $I_i$ are related to the $a_i$ functions of Equation 5 in that each $a_i$ functions consists of a linear combination of one or more $I_i$ functions. This relationship is made more obvious if Equations 5 are expanded and *x* is expressed in terms of *t* according to Equation 4.

$$a_0=\frac{1}{t_2-t_1}\int_{t_1}^{t_2}g(t)dt \qquad (8)$$

$$a_1=\frac{-3}{t_2-t_1}\int_{t_1}^{t_2}g(t)dt+\frac{6}{(t_2-t_1)^2}\int_{t_1}^{t_2}g(t)(t-t_1)dt$$

$$a_2=\frac{5}{(t_2-t_1)}\int_{t_1}^{t_2}g(t)dt-\frac{30}{(t_2-t_1)^2}\int_{t_1}^{t_2}g(t)(t-t_1)dt+\frac{30}{(t_2-t_1)^3}\int_{t_1}^{t_2}g(t)(t-t_1)^2dt$$

The linear combinations of the $I_i$ functions that comprise the $a_i$ functions are thus:

$$\begin{aligned}a_0&=I_0\\ a_1&=-3I_0+6I_1 \qquad (9)\\ a_2&=5I_0-30I_1+30I_2\end{aligned}$$

Since one objective of each discriminator would be to linearly combine its input signals even if $a_i$ functions were applied, there is no increase in structural complexity introduced by the substitution of $I_i$ functions for $a_i$ functions. This substitution merely affects the relative weights assigned to the discriminator inputs and has the advantages of permitting the use of simple polynomial approximators.

In the following theoretical discussion and numerical example, theoretical weights $\alpha_i$ are computed. These weights would be applicable to the discriminator circuits if $a_i$ functions were generated by the polynomial approximators. The actual discriminator weights $q_i$ (pertaining to the $I_i$ functions) are then computed from the theoretical weights. This procedure is followed because the $a_i$ functions are considered to be more nearly distributed as independent random variables than are the $I_i$, and the calculations are simpler for independent variables. (Independence is defined on pp. 204, 205 of a text entitled An Introduction to Probability Theory and Its Applications, volume 1, by William Feller, 1957, which is published by John Wiley & Sons, and has a Library of Congress Card Number 57-10805.)

Each of the eight band circuits 4 provide three output signals, giving a total of twenty-four signals. Each discriminator 14 receives each of the twenty-four signals, but the individual weights assigned to each signal within a group of signals from a single band circuit are independent of the individual weights assigned to the signals within other groups. This independence is due to the fact that separate polynomials are defined by each group of three signals. The following discussion and numerical example are limited to the procedure for determining the relative weights to be assigned to a single group of three inputs in a single discriminator. The numerical example is limited to the weights assigned to the signals from the band $P_8/P_9$ circuit to the 1-2 discriminators. These procedures and examples may obviously be extended to all of the inputs of all of the discriminators.

As previously explained, the first goal of this discussion is to provide a procedure for obtaining the weights $\alpha_i$ that would be used by a discriminator in a system where the polynomial approximator provided outputs representative of the $a_i$ functions as defined in Equation 8.

The output $D(s-r)$ of the discriminator which distinguishes the specimen with respect to two reference digits "$s$" and "$r$" may be defined as:

$$D(s-r)=\sum_i \alpha_i a_i \tag{10}$$

The weights $\alpha_i$ are determined from a sample of utterances of the reference digits "$s$" and "$r$." One simple technique, among the various available techniques, is based on the following assumptions concerning a sample of utterances of the reference digits $s$ and $r$. Consider $a_{ik}(s)$ and $a_{ik}(r)$ to be the $a_i$ functions generated by the $k$th utterances of the reference digits $s$ and $r$, respectively. Assume that, for each of the three values of $i$, $a_i(s)$ and $a_i(r)$ are random variables with normal (Gaussian) distributions, having means $\mu_i(s)$ and $\mu_i(r)$ and standard deviations $\sigma_i(s)$ and $\sigma_i(r)$. Further assume that the distributions for different values of $i$ are independent. Then for each $i$ there exist estimated means $\hat{\mu}_i(s)$ and $\hat{\mu}_i(r)$ and estimated standard deviations $\hat{\sigma}_i(s)$ and $\hat{\sigma}_i(r)$ calculated from the sample by:

$$\hat{\mu}_i(s)=\frac{1}{n_s}\sum_{k=1}^{n_s} a_{ik}(s)$$

$$\hat{\mu}_i(r)=\frac{1}{n_r}\sum_{k=1}^{n_r} a_{ik}(r) \tag{11}$$

$$\hat{\sigma}_i(s)=\left\{\frac{1}{n_s-1}\sum_{k=1}^{n_s}[a_{ik}(s)-\hat{\mu}_i(s)]^2\right\}^{1/2}$$

$$\hat{\sigma}_i(r)=\left\{\frac{1}{n_r-1}\sum_{k=1}^{n_r}[a_{ik}(r)-\hat{\mu}_i(r)]^2\right\}^{1/2} \tag{12}$$

where $n_s$ and $n_r$ are the sample sizes for the digits $s$ and $r$ respectively.

Estimation of means is discussed in chapter 8 of a text entitled Statistical Theory in Research by R. L. Anderson and T. A. Bancroft, published by the McGraw-Hill Book Co. 1952, Library of Congress Catalog Card Number 52-5984.

Estimation of standard deviations is indicated in problem 38 and footnote 12 on page 227 of the previously-mentioned Feller text.

It is necessary to compute $\alpha_i$ so that the quantity $D(s-r)$ from Equation 10 is different for the specimen digits $s$ and $r$. The function $D(s-r)$ has two distributions, one corresponding to an input specimen $s$ and one corresponding to an input specimen $r$, characterized by means $\mu_D(s)$ and $\mu_D(r)$ and standard deviations $\sigma_D(s)$ and $\sigma_D(r)$. Since $a_i$ are assumed to be independent variables, then the following formulae are valid as shown in chapter IX of the previously-mentioned Feller reference.

$$\mu_D(s)=\sum_i \alpha_i\mu_i(s)$$

$$\mu_D(r)=\sum_i \alpha_i\mu_i(r) \tag{13}$$

$$\sigma_D(s)=\left[\sum_i \alpha_i^2\sigma_i^2(s)\right]^{1/2}$$

$$\sigma_D(r)=\left[\sum_i \alpha_i^2\sigma_i^2(r)\right]^{1/2} \tag{14}$$

The characteristics defined in Equations 13 and 14 are used to determine $\alpha_i$ to maximize the probability that the quantity $D(s-r)$ in Equation 10 will be larger than a threshold B for an input reference specimen $s$ and smaller than B for a specimen $r$. Equation 10 may be altered to give:

$$D(s-r)=\sum_i \alpha_i a_i - B \tag{15}$$

In this case, the problem becomes one of maximizing the probability that $D(s-r)$ is positive for the reference specimen $s$ and negative for $r$. Rather than maximize this probability, it is sufficient to maximize some monotonic function of the probability. One such monotonic function is the distance from the threshold B to the means $\mu_D(s)$ and $\mu_D(r)$ divided by the standard deviations $\sigma_D(s)$ and $\sigma_D(r)$. These distances R($s$) and R($r$) are thus:

$$R(s)=\frac{\mu_D(s)-B}{\sigma_D(s)}$$

$$R(r)=\frac{B-\mu_D(r)}{\sigma_D(r)} \tag{16}$$

It is desirable that the probability of a specimen $s$ being incorrectly identified as an $r$ equal the probability of an $r$ being incorrectly identified as an $s$. Since R($s$) and R($r$) are monotonic functions of these probabilities, the probabilities are equal when $R(s)=R(r)$. This may be accomplished by choosing B as follows.

$$B=\frac{\sigma_D(s)\mu_D(r)+\sigma_D(r)\mu_D(s)}{\sigma_D(s)\sigma_D(r)} \tag{17}$$

This selection of B when substituted into Equations 16 provides:

$$R(s)=\frac{\mu_D(s)-\dfrac{\sigma_D(s)\mu_D(r)+\sigma_D(r)\mu_D(s)}{\sigma_D(s)+\sigma_D(r)}}{\sigma_D(s)}$$

$$R(r)=\frac{\dfrac{\sigma_D(s)\mu_D(r)+\sigma_D(r)\mu_D(s)}{\sigma_D(s)+\sigma_D(r)}-\mu_D(r)}{\sigma_D(r)} \tag{18}$$

Equations 18 may be simplified to give:

$$R(s)=\frac{\mu_D(s)-\mu_D(r)}{\sigma_D(s)+\sigma_D(r)}$$

$$R(r)=\frac{\mu_D(s)-\mu_D(r)}{\sigma_D(s)+\sigma_D(r)} \tag{19}$$

Thus, if B is chosen according to Equation 17, then R($s$)=$R(r)$ and the probabilities of incorrect identification with respect to the two reference specimens $s$ and $r$ are equal.

It is now necessary to maximize either R(*s*) or R(*r*). This maximization problem is difficult to solve exactly. A simplification, however, is obtained by assuming:

$$\sigma_i(s)=k\sigma_i(r) \quad (20)$$

where $k$ is a constant for all $i$. Making use of (13), (14), (19) and (20) it can be shown that:

$$R(s)=\frac{\sum_i \alpha_i\left[\mu_i(s)-\mu_i(r)\right]}{\left[\sum_i \alpha_i^2\sigma_i^2(r)\right]^{1/2}\left[1+k\right]} \quad (21)$$

Therefore:

$$\frac{\partial R(s)}{\partial \alpha_i}=\frac{1}{2}\left\{\frac{\left[\sum_{i'}\alpha_{i'}^2\sigma_{i'}^2(r)\right]^{1/2}\left[\mu_i(s)-\mu_i(r)\right]-\sum_{i'}\left[\alpha_{i'}(\mu_{i'}(s)-\mu_{i'}(r)\right]^{1/2}\frac{2\alpha_i\sigma_i^2(r)}{\left[\sum_{i'}\alpha_{i'}^2\sigma_{i'}^2(r)\right]^{1/2}}}{(1+k)\sum_{i'}(\alpha_{i'}^2\sigma_{i'}^2(r))}\right\} \quad (22)$$

Those values of $\alpha_i$ which maximize R(*s*) make $$\frac{\partial R(s)}{\partial \alpha_i}$$

vanish. This means that the numerator on the right side of (22) must vanish. By rearranging some terms, this latter condition can be written:

$$\alpha_i=\left[\frac{\mu_i(s)-\mu_i(r)}{\sigma_i^2(r)}\right]\left[\frac{\sum_{i'}\alpha_{i'}^2\sigma_{i'}^2(r)}{\sum_{i'}\alpha_{i'}[\mu_{i'}(s)-\mu_{i'}(r)]}\right] \quad (23)$$

Now the factor $$\frac{\sum_i \alpha_{i'}^2\sigma_{i'}^2(r)}{\sum_{i'}\alpha_{i'}[\mu_{i'}(s)-\mu_{i'}(r)]}$$

can be chosen arbitrarily, because multiplying all $\alpha_i$ by some constant factor does not affect the value of R as it can be seen from Equation 21 that R(*s*) is a homogeneous function of degrees 0 of $\alpha_i$. Therefore, for simplicity, choose:

$$\frac{\sum_{i'}\alpha_{i'}^2\sigma_{i'}^2(r)}{\sum_{i'}\alpha_{i'}[\mu_{i'}(s)-\mu_{i'}(r)]}=\frac{1}{1+k^2} \quad (24)$$

Substituting Equation 24 into Equation 23 provides $$\alpha_i=\frac{\mu_i(s)-\mu_i(r)}{\sigma_i^2(r)(1+k^2)}=\frac{\mu_i(s)-\mu_i(r)}{\sigma_i^2(r)+[k\sigma_i(r)]^2} \quad (25)$$

Substituting Equation 20 into Equation 25 provides $$\alpha_i=\frac{\mu_i(s)-\mu_i(r)}{\sigma_i^2(r)+\sigma_i^2(s)} \quad (26)$$

Since the actual values of $\mu_i(s)$ and $\mu_i(r)$ are not known, the estimated values from Equations 11 and 12 are used. That is, $\alpha_i$ are computed by:

$$\alpha_i=\frac{\hat{\mu}_i(s)-\hat{\mu}_i(r)}{\hat{\sigma}_i^2(s)+\sigma_i^2(r)} \quad (27)$$

The preceding theoretical discussion is the basis for the numerical example of the computation of $\alpha_i$ from the following values of $a_i$ found by experiment for the digits 1 and 2 where *s* refers to the digit 1 and *r* refers to the digit 2.

$$\alpha_1(1)=-1.74000;\ -1.57404;\ -1.50417$$

$$a_1(2)=1.22343;\ 1.75329;\ 0.69126$$

Then according to Equations 11 and 12

$$\hat{\mu}_1(1)=\frac{-1.74000-1.57404-1.50417}{3}=-1.60607$$

$$\hat{\mu}_1(2)=\frac{1.22343+1.75329+0.69126}{3}=1.22266$$

$$[\hat{\sigma}_1(1)]^2=\tfrac{1}{2}[(-1.74000+1.60607)^2+(-1.57404+1.60607)^2+(-1.50417+1,60607)^2]=0.0147$$

$$[\sigma_1(2)]^2=\tfrac{1}{2}[(1.22343-1.22266)^2+(1.75329-1.22266)^2+(0.69126-1.22266)^2]=0.282$$

Then according to Equation 27:

$$\alpha_1=\frac{-1.60607-1.22266}{0.0147+0.282}=-9.53$$

In the sample calculation, only three utterances of each digit were considered. In the design of the embodiment, a sample of ten utterances of each digit are used. With this larger sample, it is found that: $\alpha_1=-5.17$. Similar computations result in $\alpha_0=3.40$ and $\alpha_2=0.617$.

It was assumed in the above discussion that the polynomial approximators 8 provided $a_i$ function outputs. These outputs were weighted by corresponding factors $\alpha_i$ and summed in a discriminator 14 according to Equation 10. As we have seen, for simplicity, the polynomial approximators 8 are designed to generate $I_i$ functions which are related to the $a_i$ functions according to Equations 9. For this reason, a procedure is required for determining the actual discriminator weights $q_i$ from the theoretical weights $\alpha_i$. The following Equation 28 defines the relationship between $\alpha_i$ and $q_i$.

$$D(s-r)=\sum_i \alpha_i a_i=\sum_i q_i I_i \quad (28)$$

Substituting Equation 9 into Equation 28 provides:

$$\alpha_0 I_0+\alpha_1(-3I_0+6I_1)+\alpha_2(5I_0-30I_1+30I_2)=q_0I_0+q_1I_1+q_2I_2 \quad (29)$$

Equation 27 may be rewritten as:

$$(\alpha_0-3\alpha_1+5\alpha_2)I_0+(6\alpha_1-30\alpha_2)I_1+30\alpha_2I_2=q_0I_0+q_1I_1+q_2I_2 \quad (30)$$

Therefore $q_i$ is related to $\alpha_i$ by:

$$q_0=\alpha_0-3\alpha_1+5\alpha_2 \quad (31)$$
$$q_1=6\alpha_1-30\alpha_2$$
$$q_2=30\alpha_2$$

The numerical example may now be continued to determine $q_i$ from $\alpha_i$ using Equations 31:

$$\alpha_0=3.40$$
$$\alpha_1=-5.17$$
$$\alpha_2=0.617$$
$$q_0=3.40-3(-5.17)+5(0.617)=22.0$$
$$q_1=6(-5.17)-30(0.617)=-49.5$$
$$q_2=30(0.617)=18.5$$

These weights $q_i$ pertain only to the input signals to the 1–2 discriminator 14 that were generated by the band $P_8/P_9$ circuit 4. Since 45 discriminators are used in the embodiment and since each discriminator has 24 input signals, a total of 1,080 values for $q_i$ must be calculated.

In the embodiment, one exception is made. The third output ($I_2$) of the band $P_7/P_t$ circuits is not used, because it has been found that this signal contributes little to the discrimination of the speech signal.

Since only $I_0$ and $I_1$ are generated, only weights $\alpha_0$ and $\alpha_1$ are computed and Equations 31 are replaced by:

$$q_0=\alpha_0-3\alpha_1$$
$$q_1=6\alpha_1 \quad (32)$$

An additional input, $t$, representing the duration of the vowel portion of the specimen is applied to the discriminators. This may be considered as either $a_0$ or $I_0$ as they are equal. $\alpha_0$ is the only weight that is computed and $\alpha_0=q_0$. This additional input is used because it has been found to contribute valuable data for the discrimination between certain specimens.

The embodiment of the invention that was shown and described with respect to the block diagram (FIGURE 1) is now described in detail with respect to FIGURE 3.

The output of a microphone 2 is applied to a group of band circuits 4 through an amplifier 101. Each band circuit contains one or two band-pass filters 102 which select those components of their applied signals which are within the band of frequencies to which they are tuned. The output of each band-pass filter 102 is applied to a square-law detector 104 which generates an output voltage indicative of the square of one polarity of the applied voltage. Since power is proportional to the square of the voltage the output of the detectors is indicative of the power in the band of frequencies passed by filters 102. The outputs of the detectors 104 are smoothed by low pass filters 106 and applied as the inputs to divider circuits 108. One band circuit (band $P_8/P_9$) is used which contains two band pass filters 102, two detectors 104, and two low pass filters 106. The divider 108 in this band circuit produces an output proportional to the ratio of the powers of the signals in two bands whereas the dividers in the other band circuits provide an output proportional to the ratio of the power in a band to total power. The bands passed by the filters in the band $P_8/P_9$ circuit were chosen to be indicative of the front-back vowel distinction. The previously-cited Wise reference defines vowel types at page 87. The following table indicates the approximate bands of frequencies passed by the band-pass filters in the various circuits.

| Filter: | Frequency (c.p.s.) |
|---|---|
| 1 | 0–200 |
| 2 | 200–400 |
| 3 | 400–800 |
| 4 | 800–1200 |
| 5 | 1200–1800 |
| 6 | 1800–2600 |
| 7 | 2600–4000 |
| 8 | 200–1400 |
| 9 | 1500–6000 |
| Vowel | 0–800 |
| Consonant | 7000–8000 |

The total power circuit 11 contains a detector 104 and a low-pass filter 106 and provides an output indication of the total power in the speech specimen. This signal is applied to the dividers of those band circuits that generate outputs proportional to the ratio of the power in a band to total power. The output of the total power circuit 12 is also applied to a timing circuit 20.

The vowel-consonant circuit 12 is similar to a band circuit 4 in that it contains band-pass filters 102, detectors 104 and low-pass filters 106. The vowel-consonant circuit outputs are indicative of the "vowel" power and the "consonant" power in the speech specimen, where the terms "vowel" and "consonant" are loosely used to refer to the relatively low and high frequencies, respectively.

The timing circuit 20 accepts signals indicative of total power, vowel power and consonant power and provides five outputs: a reset signal to each time variation approximator circuit 112; indications of the duration of the vowel portion of the specimen labelled $t$, $t^2$ and $t^3$; and a sample pulse to the decoding matrix 16.

The band circuit divider 108 outputs are applied to logarithmic generators 110 to generate signals indicative of $$\log\left(\frac{CP_i}{P_j}+1\right)$$

where $P_i$ and $P_j$ represent the power in bands $i$ and $j$ and where $C=1000$. The symbol "log" is used to denote logarithms to the base "$e$" which are also called natural or Naperian logarithms. These signals are applied to the time variation approximators 112 which generate the following signals:

$$I=\frac{1}{(t_2-t_1)}\int_{t_1}^{t_2}\log\left[1000\frac{P_i}{P_j}+1\right]dt$$

$$I_1=\frac{1}{(t_2-t_1)^2}\int_{t_1}^{t_2}(t-t_1)\log\left[1000\frac{P_i}{P_j}+1\right]dt$$

$$I_2=\frac{1}{(t_2-t_1)^3}\int_{t_1}^{t_2}(t-t_1)^2\log\left[1000\frac{P_i}{P_j}+1\right]dt \quad (33)$$

where $t_1$ and $t_2$ are the values of $t$ at the start and end of the "vowel" portion of the specimen, respectively.

These expressions are general and are valid for any values $t_1$ and $t_2$. In order to simplify the expressions in the drawings, they are written in a form based on the assumption that $t_1=0$.

The outputs of the time variation approximator circuits are applied directly, or through inverters, to each of a group of discriminators which comprise a summing amplifier 114 and a group of input resistances. The values of the resistances of the inputs to the summing amplifiers are dependent upon the characteristics of the reference speech to which the speech specimen is to be compared, and control the relative weights that are applied to the time variation approximator outputs. Each summing amplifier output signal amplitude is dependent upon the amplitudes of the applied input signals divided by the resistances of the input resistors through which they are applied. That is, a signal applied through a large input resistor has less effect on the summing amplifier output than one applied through a smaller resistor. Sample values of the summing amplifier input resistances are provided in FIGURE 4. These values were obtained as the inverses of $q_i$ which were computed using the procedures outlined above for a group of sample speech specimens. For example, $q_0$, $q_1$ and $q_2$, for the inputs to the 1–2 discriminator from the band $P_8/P_9$ circuit, were found to equal 22.0, −49.5 and 18.5 respectively. Thus, the corresponding resistances are proportional to $$\frac{1}{22.0},\ \frac{1}{-49.5},\ \frac{1}{18.5}$$

or 0.045, −0.020, and 0.054. These numbers are proportional to the numbers within the heavy boxes in FIGURE 4a. The chart is labelled along the left side to indicate the summing amplifier (discrimination) designation and along the top to define the input signals. For example, column $$\frac{P_2}{P_{tot}}$$

under designation $$\frac{1}{t_2^2}\int_0^{t_2}t\cdot\log\left[1000\frac{P_i}{P_j}+1\right]dt$$

provides the summing amplifier input resistances for the inputs connected to the center output ($I_1$) of the time variation approximator 112 in the band $P_2/P_{tot}$ circuit 6. The final column of the chart indicates the input resistances to the summing amplifiers from the $t$ output of the timing circuit 20. A reference in FIGURE 4 to a negative resistance indicates that the inverted output of the time variation approximator is used rather than the direct output. The inherent inversion of the summing amplifiers is accounted for by the polarity of the input resistances in FIGURE 4. For this reason, the values calculated above differ in sign from the chart values. Each summing amplifier has an additional input from a potentiometer 116 which is adjusted before operation to provide the correct reference level for the summing amplifiers. This adjustment is experimentally made, using reference speech specimens as the input to the system to obtain optimum discrimination between the two reference digits pertaining to the summing amplifier.

Two outputs from each summing amplifier are applied to the decoding matrix 16; the direct output of the summing amplifier and the output of the summing amplifier after inversion. The decoding matrix consists of a group of "and" gates which provide an output signal on a lead 117 corresponding to the identity of the speech specimen. This output is provided while the sample pulse applied from the timing circuit 20 is present. The decoding matrix is shown in detail in FIGURE 5 to comprise ten horizontally located diode "and" gates, each having nine inputs. An output is present on a lead 117 only when all nine inputs to the corresponding "and" gate are present. The first numeral in the summing amplifier designation refers to the horizontal lead designation to which the uninverted amplifier output is applied and the second numeral of the amplifier designation refers to the inverted amplifier output connection. Thus, the "0–2" summing amplifier outputs are directly connected to the zero output lead 117 and inverted and connected to the two output lead.

A reject signal is generated on a lead 118 when the decoding matrix provides no output. If the decoding matrix generates an output, there is an output from an "or" gate 120 which is applied through an inverter 122 to inhibit an "and" gate 124. If there is no decoding matrix output, the "and" gate passes the sample pulse from the timing circuit through a delay 125 to provide a reject indication. The delay 125 compensates for the inherent delays in the matrix 16, the "or" gate 120 and the inverter 122.

Figure 6:
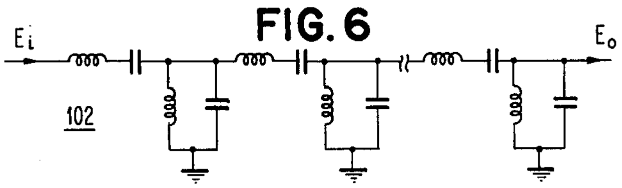
Figure 7:
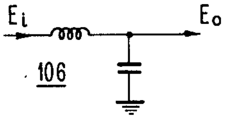

FIGURE 6 is a detailed diagram of a band-pass filter 102 that is suitable for use in the embodiment shown in FIGURE 3. The low-pass filter shown as a block in FIGURE 3 is of the well-known type shown in detail as FIGURE 7.

Figure 8:
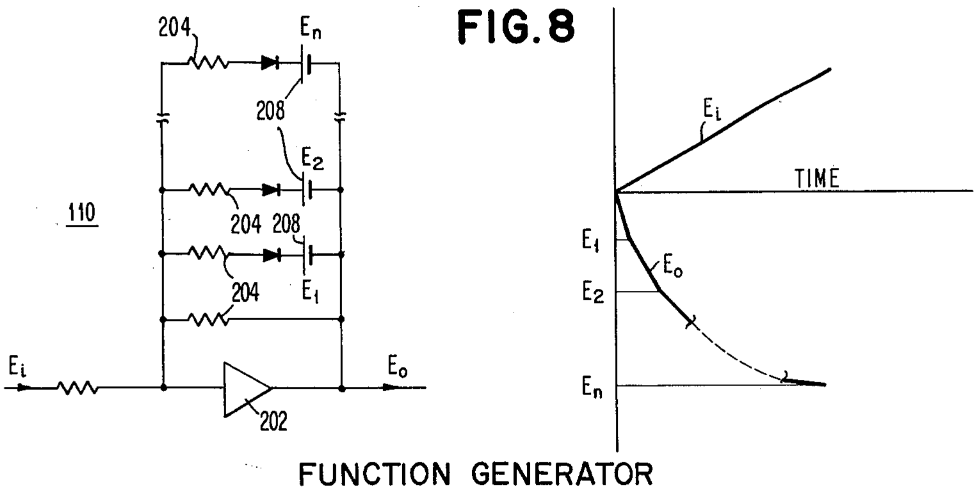

The function generator shown in FIGURE 8 contains an amplifier 202 and a group of feedback resistances 204. There are several feed-back paths—all but one contain a diode 206 and a battery 208. Each battery supplies a voltage that is different from the voltages applied by the other batteries (as shown on the wave-shape). The number of feed-back resistances that have an effect on the circuit is dependent upon the amplitude of the input voltage. That is, as the input signal increases (in a positive direction) the bias voltages on diodes 206 caused by batteries 208 are successively overcome and the diodes conduct placing additional feed-back paths in the circuit. The amplifier 202 is a conventional D.C. amplifier that is well-known in the art. The shape of the output voltage depends upon the shape of the input voltage, voltages $E_1$, $E_2$, . . . $E_n$ (supplied by batteries 208) and the resistance of the feed-back resistors 204. By using a large number of feed-back paths, an output voltage wave form comprising a large number of short straight lines is generated which approximates the desired function of the input signal. This function could be the logarithm of the input signal. In this case the function generator becomes a logarithmic generator of the type that may be used in FIGURE 3. A circuit similar to this is shown on page 154 of a text authored by Clarence L. Johnson entitled Analog Computer Techniques, published by McGraw-Hill, 1956, Library of Congress Catalog Card 56–7560.

Figure 9:
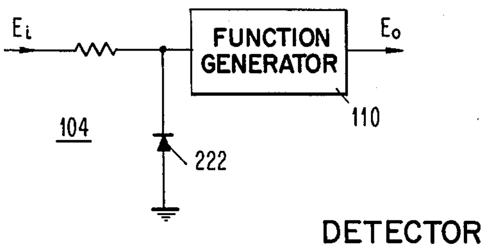
Figure 9:
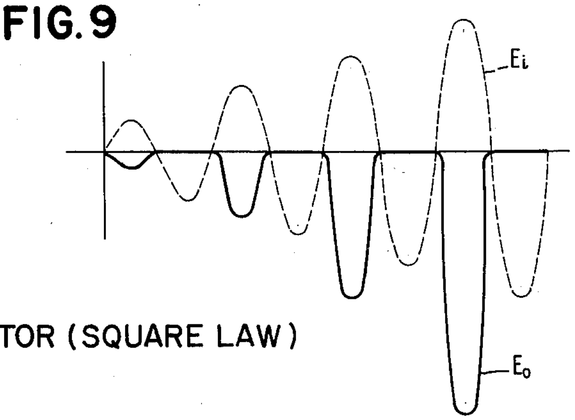

A square-law detector 104 of the type used in FIGURE 3 is shown in FIGURE 9 to be comprised of a function generator of the type shown in FIGURE 8 with a diode detector at its input. The batteries used in this circuit are selected to provide an output voltage related to the square of the input voltage. The waveshape shown in FIGURE 9 indicates that the negative half of the input signal is removed by diode 222 and the positive half of the signal is applied to a function generator. Since the amplifier in the function generator inverts the input, the positive input signals will generat negative output signals. A sinusoidal input is shown and the circuit produces negative output pulses indicative of the square of the amplitude of the positive half cycle of the input signal.

Figure 10:
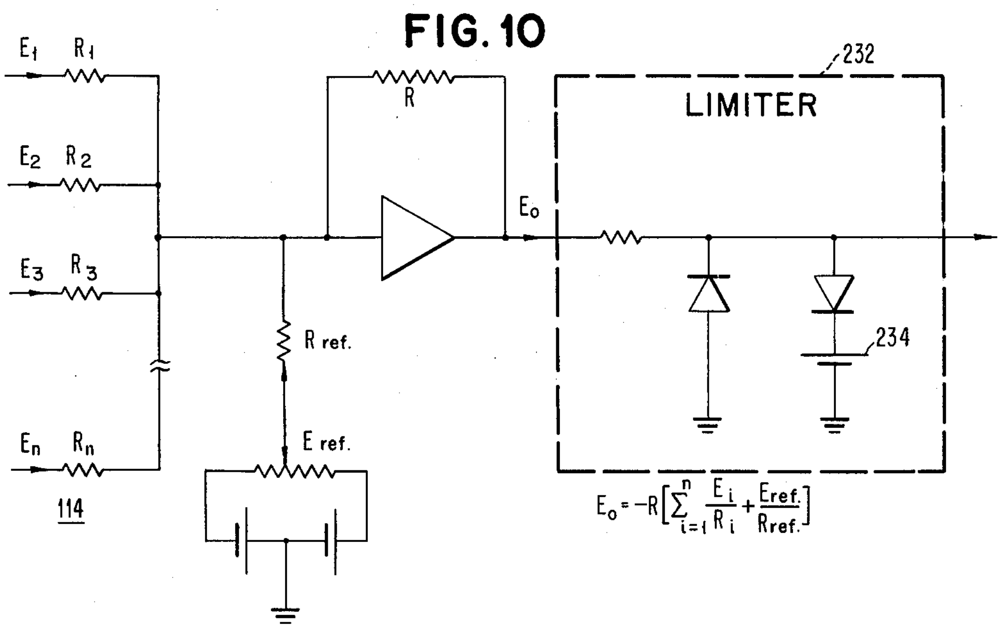

FIGURE 10 shows a summing amplifier with a limited output. The output of the amplifier, ignoring the limiter circuit, may be represented as:

$$-R\left[\sum_{i=1}^{n}\frac{E_i}{R_i}+\frac{E_{ref}}{R_{ref}}\right]$$

This amplifier is described in detail in the text authored by Clarence L. Johnson on page 9. The limiter 232 is of the well-known diode type limiter which limits the applied signals between a positive level (determined by the voltage supplied by a battery 234) and ground.

Figure 11:
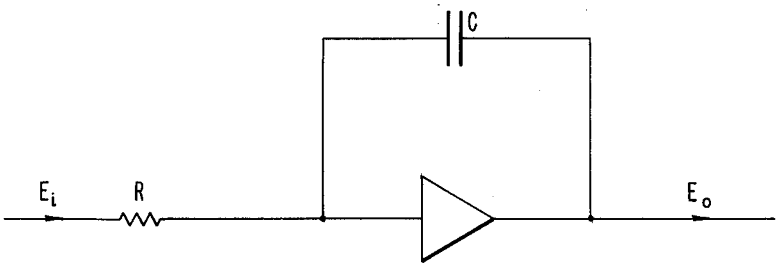
Figure 12:
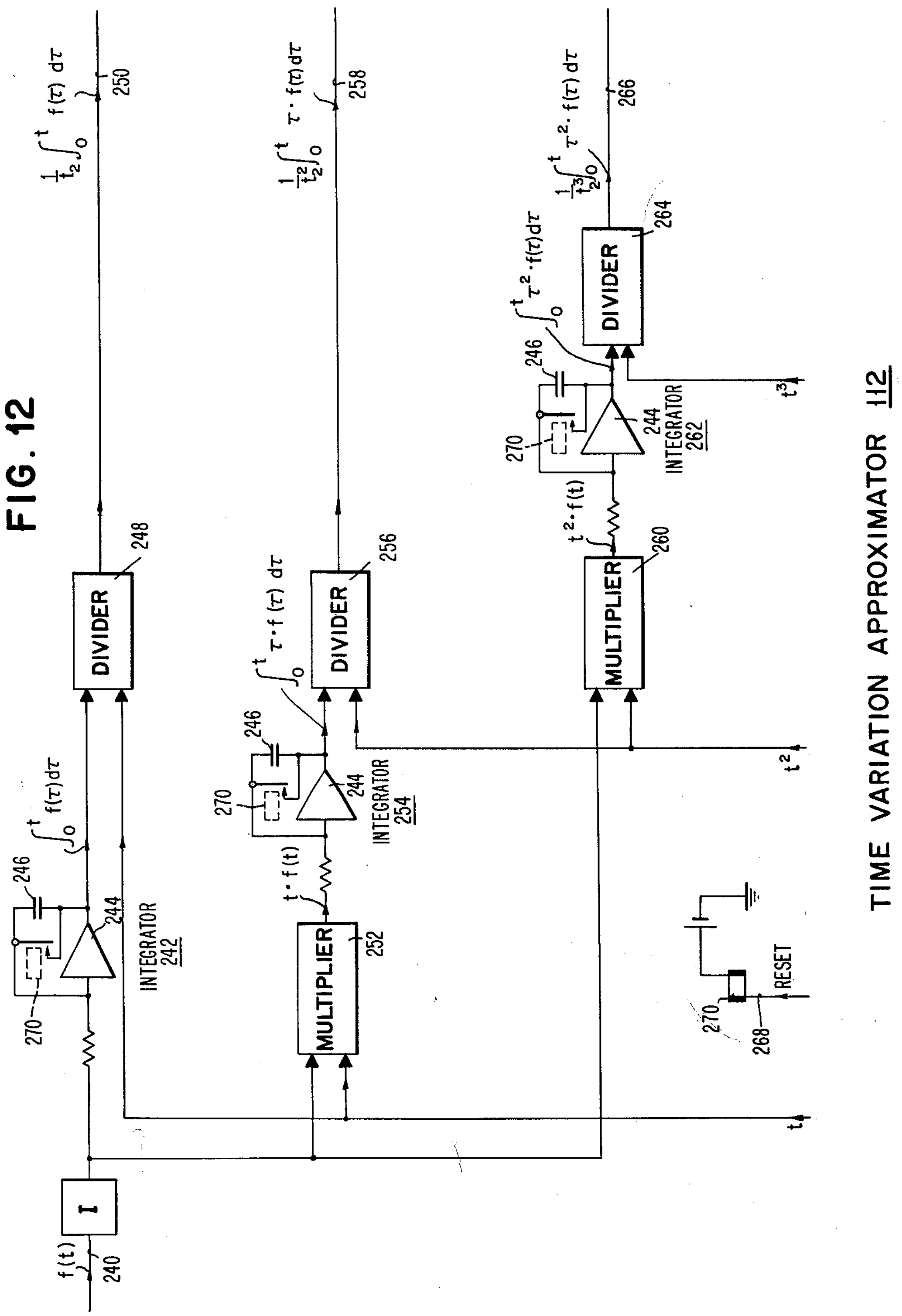

An integrator is shown in FIGURE 11. This circuit generates an output voltage which may be represented as $$-\frac{1}{RC}\int E_i dt$$

This circuit is also described in the Clarence L. Johnson text on page 9. A time-variation approximator 112 suitable for use in the embodiment of FIGURE 3 is shown in detail in FIGURE 12. This circuit has 5 inputs, a function $f(t)$ and four signals from the timing circuit: $t$, $t^2$, $t^3$ and a reset signal. The purpose of this circuit is to generate the previously-described signals: $I_0$, $I_1$ and $I_2$ as defined in Equation 33.

The variable of integration is denoted by $\tau$ to distinguish it from the upper circuit of integration $t$. It is well known that such a replacement does not affect the value of the integral. At $t=t_2$, the output voltages have the values $I_0$, $I_1$ and $I_2$.

The input signal $f(t)$ is inverted to compensate for the inherent inversion of the integrators in the time-variation approximators. This signal is then integrated over time by an integrator 242 comprising a D.C. amplifier 244 and a feed-back capacitor 246, and is similar to the integrator described with respect to FIGURE 11 with the exception of a pair of relay contacts to be described below. The integrator output is then divided by $t_2$ to generate the first output of the time-variation approximator on a lead 250. A multiplier-divider circuit suitable for use in this circuit and in the band circuits 6 shown in FIGURE 3 can be found on page 139 of the Clarence L. Johnson reference. The second output of this variation approximator circuit is obtained by first multiplying the input function by $t$ in a multiplier 252, integrating the result in an integrator 254, and dividing the integrator output by $t^2$ using a divider 256. This signal is present on a lead 258. The third output of the time variation approximator is obtained by multiplying the input signal by $t^2$ in a multiplier 260, integrating the result in an integrator 262 and dividing the integrator output by $t^3$ using a divider 264. This signal is present in a lead 266. A signal present on a lead 268 from the timing circuit 20 causes relay 270 to be operated when the integrators are not in use. The generation of this signal will be described with respect to the timing circuit. The integrator feedback capacitors are shorted by contacts of relay 270 during this time. That is, the integrators are operated only during (and for a short time after) the time that the input speech specimen is being analyzed ("vowel" time).

Figure 13:
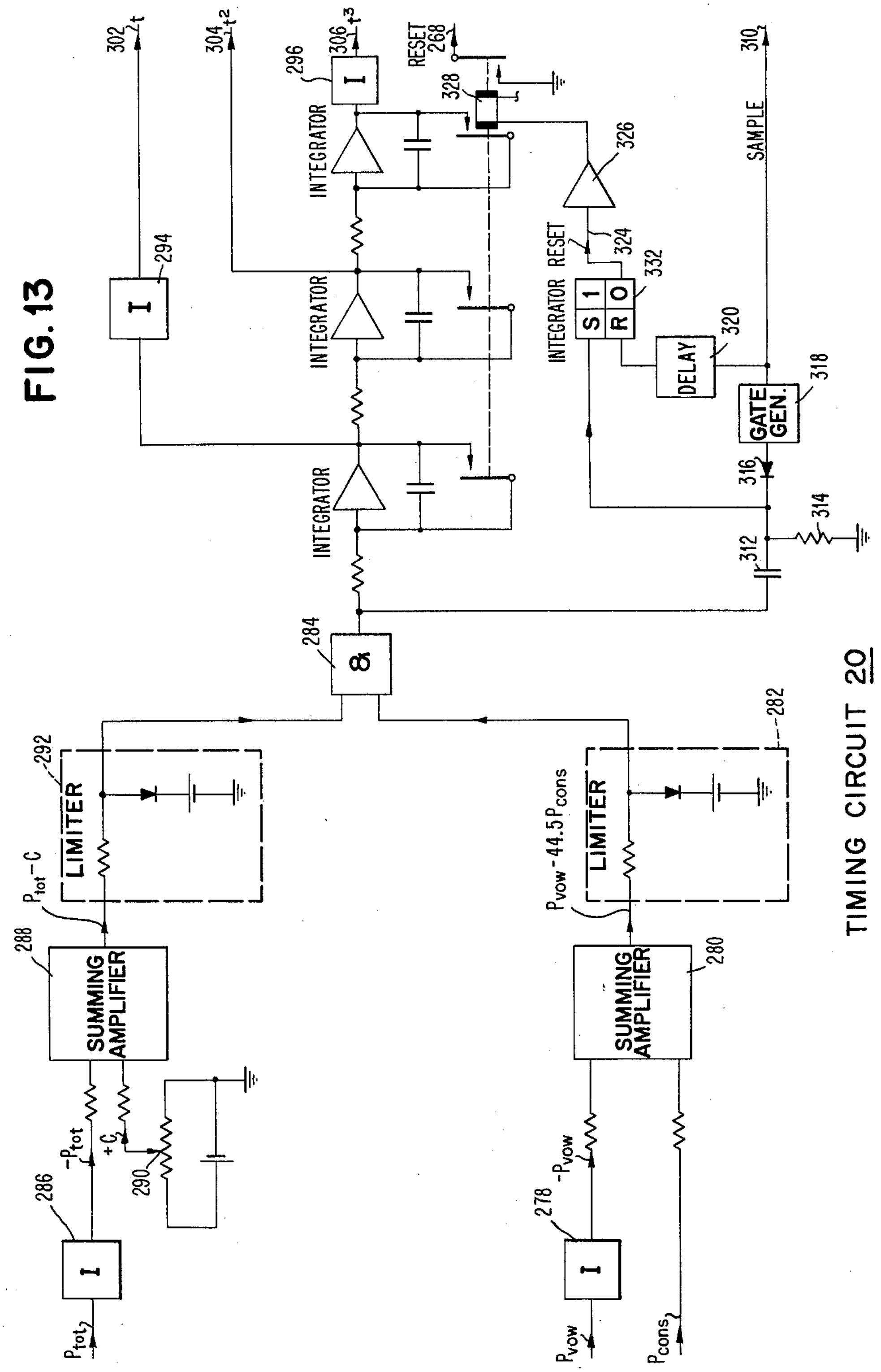

The timing circuit 20 is shown in detail in FIGURE 13. This circuit generates five outputs: $t$, $t^2$, $t^3$, a reset signal to the time variation approximator and a sample pulse to the decoding matrix 16. Time $t$, as generated by this circuit varies from $t=0$ to $t=t^2$ which are the limits of the vowel portion of the specimen. The inputs to the timing circuit are total power, vowel power and consonant power. The vowel power input signal is applied through an inverter 278 to a summing amplifier 280. The consonant power is multiplied by 44.5 which is determined by the selected approximate power relationship between a consonant and a vowel. The output of the amplifier represents $P_{vow}-44.5P_{cons}$ due to the inversion of the amplifier. This signal is limited in its positive direction by a limiter 282 of the conventional type and applied to an "and" gate 284. The other input to the "and" gate is generated by applying total power through in inverter 286 and combining it with a constant in a summing amplifier 288 to develop a signal representing total power minus a constant. The constant is determined by the setting of a potentiometer 290. A second limiter 292 limits the output of the amplifier 288 to a positive level. The "and" gate 284 provides an output signal when the vowel power is sufficiently greater than the consonant power and there is adequate total power in the circuit. This signal is integrated three times to generate signals: $-t$, $t^2$ and $t^3$. The $t$ and $t^3$ signals are applied to inverters 294 and 296 respectively, to correct the polarity change introduced by the inversion of the integrators. The $t^2$ lead does not need an inverter because it is generated by an even number (two) of integrators. The output signal $t$ on lead 302 is a sawtooth waveshape. The shape of this sawtooth voltage is such that during each hundredth of a second it changes by an amount equal to the amount that the output of a logarithmic generator 110 (FIGURES 3*a*, 3*b* and 8) changes when its input is multiplied by $e$, where $e=2.718$ representing the base of the natural logarithm. The summing amplifier input resistances shown in FIGURES 4*a* and 4*b* for the column "$t$" are based on this relationship. The output on lead 304 (indicative of $t^2$) and the output on lead 306 (indicative of $t^3$) are curves resulting from the integration of the sawtooth waveshape at lead 302.

Figure 3D:
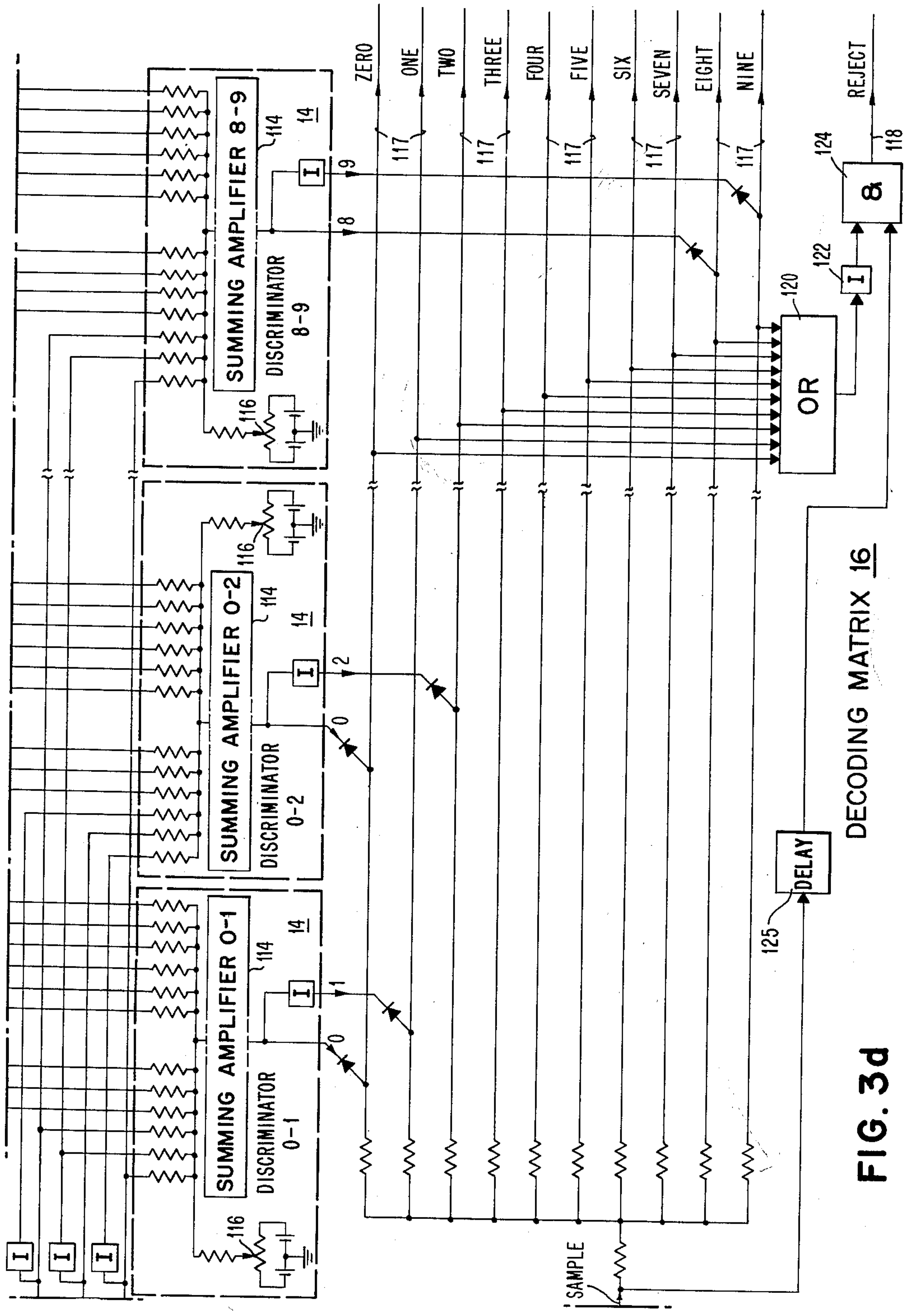

The timing circuit also generates a reset signal and a sample signal on leads 268 and 310 respectively. The output of "and" gate 284 is applied to a differentiator comprising capacitor 312 and a resistor 314 to generate a positive spike at the beginning of the vowel portion of the specimen ($t_1-0$) and a negative spike at the end of vowel time ($t_2$). The negative spike is passed by diode 316 to trigger a gate generator 318 which provides the output sample pulse on lead 310. The gate generator output is also applied to a bistable circuit 322. This circuit provides a postive output level of lead 324 which is applied through an amplifier 326 to operate a relay 328. The purpose of this relay is to provide bypasses for the capacitors in the timing circuit integrators as well as to provide a ground signal on lead 308 to be applied to the time variation approximator circuits 112 shown in detail in FIGURE 10. The bistable circuit 322 is set at the beginning of the vowel time by the positive spike from the differentiator. This removes the bypass across the integrator capacitor in the timing circuits as well as in the time variation approximators, enabling them to operate during this time. Due to the inherent delay of relay 328, the integrators remain in operation after vowel time, long enough for the sample pulse on lead 310 to operate on the matrix 16 (FIGURE 3*d*).

The use of techniques of function approximation in identification systems has been illustrated and described with respect to a speech identification embodiment which use polynomial approximating functions. These techniques provide accurate identification of the specimen data based on the significant speech characteristics while disregarding other characteristics that do not contribute a substantial amount of discriminating data, and that often hamper discrimination. Three orders of approximating functions are used in the preferred embodiment to express the second-order polynomial which defines the parabolae that most closely approximate the speech specimen.

The results obtained when the invention was practiced on a group of speakers were most encouraging and it is believed that obvious extensions of these techniques will enhance identification of larger vocabularies. Sounds other than speech, such as those produced by a heart beat, earthquake, subterranean explosions, underwater vibrations, etc., may obviously be identified and distinguished by these techniques. This invention may also be used to identify electrical signals other than sounds, such as those generated in electrocardiographs and electroencephalographs.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for identifying a specimen comprising in combination: first means for generating a plurality of time-varying analog functions of said specimen; second means responsive to the output of said first means for generating $n+1$ linear functions of the coefficients of the $n$th order polynomial function of time that most closely approximates one of said time-varying analog functions of said specimen for each of said functions; third means responsive to the output of said second means for generating a plurality of functions of said linear functions of said coefficients, each of said plurality of functions being dependent upon a linear combination of individually weighted functions of said coefficients, said weights being dependent upon reference functions such that each of said generated plurality of functions of said linear functions of the coefficients has a unique value for each of at least two different specimens of said class of specimens that are similar to the reference functions; and fourth means responsive to the output of said third means for combining said last generated functions to provide an indication of the identity of said specimen.

2. A specimen identification system comprising in combination: first means responsive to a time varying specimen signal for generating a plurality of time-varying analog functions of the specimen; second means responsive to the output of said first means for generating $n+1$ linear functions of the coefficients of the $n$th order polynomial function of time that most closely approximates one of said time-varying analog functions of the specimen, for each of said functions; third means responsive to the output of said second means for generating a plurality of functions of said functions of the coefficients where each of said plurality of functions is dependent upon a linear combination of individually weighted functions of the coefficients and where said weights are dependent upon reference functions such that each of the generated plurality of functions of the linear functions of the coefficients has a unique value for each of at least two different specimens of the class of specimens that are similar to the reference functions; and fourth means responsive to the output of said third means for combining said last generated functions to provide an indication of the identity of the specimen.

3. An apparatus for identifying a time-varying analog specimen comprising in combination: first means responsive to a time-varying analog specimen for generating $n+1$ linear functions of the coefficients of the $n$th order polynomial function of time that most closely approximates the specimen; second means responsive to the output of said first means for generating a plurality of functions of said linear functions of the coefficients, where each of said plurality of functions is dependent upon a linear combination of individually weighted linear functions of the coefficients, and where said weights are dependent upon reference functions such that each of the generated plurality of functions of the linear functions has a unique value for each of at least two different specimens of the class of specimens that are similar to the reference functions; and third means responsive to the output of said second means for combining said last generated functions to provide an indication of the identity of the specimen.

4. A specimen identification system comprising in combination: first means responsive to a time-varying analog specimen for generating $n+1$ linear functions of the coefficients of the $n$th order polynomial function of time that most closely approximates the specimen; second means responsive to the output of said first means for generating a plurality of functions of said linear functions of the coefficients, where each of said plurality of functions is dependent upon a linear combination of individually weighted linear functions of the coefficients, and where said weights are dependent upon reference functions such that each of the generated plurality of functions of the linear functions of the coefficients has a unique value for each of at least two different specimens of the class of specimens that are similar to the reference functions; and third means responsive to the output of said second means for combining said last generated functions to provide an indication of the identity of the specimen.

5. A speech specimen identification device for indicating which reference word, of a group of reference words, is most similar to the speech specimen, comprising in combination: a transducer for transforming the speech specimen into a time-varying electrical signal; a plurality of filters, each responsive to the electrical signal, and each for passing that component of the electrical signal that is within a particular band of frequencies; a plurality of square-law detector circuits, each responsive to the output of a filter, and each for generating an electrical signal $P_1, P_2 \ldots P_n$ that is approximately indicative of the power in that component of the electrical signal from the transducer that is passed by the corresponding filter; a square-law detector responsive to the entire electrical signal from the transducer for generating an electrical signal $P_t$ that is approximately indicative of the total power in the electrical signal from the transducer; a plurality of divider circuits, each responsive to the electrical signals $P_1$, $P_2$, $P_3 \ldots P_n$, $P_t$ generated by two square-law detectors, and each for generating an electrical signal approximately indicative of the ratio $P_i/P_j$ of two applied signals $P_i$ and $P_j$ of the group of signals $P_1, P_2, P_3 \ldots P_n, P_t$; a plurality of logarithmic generators each responsive to the output of a divider circuit and each for generating an electrical signal approximately indicative of $f(x)$ where $$f(x)=\log\left[C\frac{P_i}{P_j}+K\right]$$

and where C and K are constants; a timing circuit responsive to the electrical signal generated by the transducer for generating a time period $t$ beginning at time $t_1$ and ending at time $t_2$; a plurality of time variation approximators, each responsive to the electrical signal generated by a logarithmic generator and to the timing circuit, and each for generating a plurality of $i$ electrical signals $I_i$ where $$I_i=\frac{1}{(t_2-t_1)^{i+1}}\int_{t_1}^{t_2}(t-t_1)^i\cdot\log\left[C\frac{P_i}{P_j}+K\right]dt$$

a plurality of discriminators, one for every pair of reference words, each responsive to the electrical signals $I_i$, and each for providing a two-level electrical signal approximately indicative of a linear combination D of signals $I_i$ according to $$D=\sum_i q_i I_i$$

where $q_i$ refers to weighting factors that are individually selected for each discriminator to provide a discriminator output of a first level when the specimen is similar to one reference word and to a second level when the specimen is similar to a second reference word; and a decoding matrix responsive to the output of the discriminators for providing an indication of the identity of the specimen.

6. A speech identification device for indicating which reference word, of a group of reference words, is most similar to the speech specimen comprising, in combination: a transducer for transforming the speech specimen into a time-varying electrical signal; a plurality of filters, each responsive to the electrical signal, and each for passing that component of the electrical signal that is within a particular band of frequencies; a plurality of detector circuits, each responsive to the output of a filter and each for generating an indication signal $P_1, P_2, P_3 \ldots P_n$ of the signal strength of the electrical signal from the transducer that is passed by the corresponding filter; a detector responsive to the entire signal from the transducer for generating an indication signal $P_t$ of the strength of this signal; a plurality of dividers, each responsive to the indication signals generated by two detectors, and each for generating a signal approximately indicative of the ratio $r$ of the two applied signals; a plurality of time variation approximators, each responsive to the signal generated by a divider and each for generating a plurality of $i$ signals where $$I_i=f(t_2-t_1)\int_{t_1}^{t_2}g(t)\cdot h(r)\,dt$$

where $f(t_2-t_1)$ is a function of the limits of integration, $g(t)$ is a function of time and where $h(r)$ is a function of a divider output; a plurality of discriminators, one for every pair of reference words, each responsive to the signals $I_i$ and each for providing a two-lever signal approximately indicative of a linear combination D of signals $I_i$ according to $$D=\sum_i q_i I_i$$

where $q_i$ refers to weighting factors that are individually selected for each discriminator to provide a discriminator output of a first level when the specimen is similar to one reference word and to a second level when the specimen is similar to a second reference word; and means responsive to the outputs of the discriminators for providing an indication of the identity of the specimen.

7. An apparatus for providing an indication of the identity of a characteristic of a given function of a variable comprising in combination: first means for generating a second function of the variable which is dependent upon the given function; second means responsive to the output of said first means for integrating the second function; means for generating a function of the ratio of both the integral and a parameter derivable from the given function, said ratio function having a reduced dependence upon another characteristic of the given function; and third means responsive to the output of said second means for generating an indication of the identity of the characteristic from the ratio function.

8. An apparatus for providing an indication of the identity of a characteristic of a given time-varying function comprising, in combination: first means for generating a second time-varying function which is dependent upon the given function; means for integrating the second fuction; second means responsive to the output of said first means for generating a function of the ratio of both the integral and a parameter derivable from the given function, said ratio function having a reduced dependence upon another characteristic of the given function; and third means responsive to the output of said second means for generating an indication of the identity of the characteristic from the ratio function.

9. An apparatus for providing an indication of the identity of a characteristic of a given time-varying function comprising, in combination: first means for generating a second time-varying function which is dependent upon the given function; second means responsive to the output of said first means for integrating the second function over a finite time interval; third means responsive to the output of said second means for generating a function of the ratio of both the integral and a parameter derivable from the given function, said ratio function having a reduced dependence upon another characteristic of the given function; and third means responsive to the output of said second means for generating an indication of the identity of the characteristic from the ratio function.

10. An apparatus for providing an indication of the identity of a characteristic of a given time-varying function comprising, in combination: first means for generating a second time-varying function of the variable which is dependent upon the given function; second means responsive to the output of said first means for integrating the second function over a finite time interval; third means responsive to the output of said second means for generating, after the termination of the time interval, a function of the ratio of both the integral and a parameter derivable from the given function, said ratio function having a reduced dependence upon another characteristic of the given function; and fourth means responsive to the output of said third means for generating, after the termination of the time interval, an indication of the identity of the characteristic from the ratio function.

11. An apparatus for providing an indication of the identity of a characteristic of a given function of a variable, comprising in combination: first means for generating a second function of the class which includes the given function and all functions of the same variable which depend upon the given function; second means responsive to the output of said first means for integrating the second function; third means responsive to the output of said second means for generating a function of the ratio of both the integral and a parameter derivable from the given function, said ratio function having a reduced dependence upon another characteristic of the given function; and fourth means responsive to the output of said third means for generating an indication of the identity of the characteristic from the ratio function.

12. An apparatus for providing an indication of the identity of a time-varying specimen comprising, in combination: first means for generating a first plurality of functions that are time-varying and dependent upon the specimen; second means responsive to the output of said first means for generating a second plurality of functions that are time-varying, each of which is dependent upon one of the first plurality of functions and a function of time; third means responsive to the output of said second means for integrating each of the second plurality of functions over a finite time interval; fourth means responsive to the output of said third means for generating a third plurality of functions, each dependent upon the ratio between one of the integrations and a parameter dependent upon the time interval; and fifth means responsive to the output of said fourth means for generating an indication of the identity of the specimen from the third plurality of functions.

13. An apparatus for providing an indication of the identity of a time-varying specimen comprising, in combination: first means for generating a first plurality of $m$ functions that are time-varying and dependent upon the specimen; second means responsive to the output of said first means for generating $n$ functions of time; third means responsive to the output of said second means for generating a first family of $n$ pluralities of functions, each plurality corresponding to one of the $n$ functions of time, where each plurality contains $m$ functions corresponding to the $m$ functions in the first plurality, and where each function in the first family of functions is a function of the corresponding function of the first plurality of functions and the corresponding function of time; fourth means responsive to the output of said third means for generating a second family of functions by integrating each function in the first family of functions over a finite time interval; fifth means responsive to the output of said fourth means for generating a third family of functions, where each function in the third family is dependent upon one of the functions in the second family of functions and upon a parameter which is dependent upon the time interval; and sixth means responsive to the output of said fifth means for generating an indication of the identity of the specimen from the third plurality of functions.

References Cited in the file of this patent

UNITED STATES PATENTS

| | | |
|---|---|---|
| 2,851,661 | Buland | Sept. 9, 1958 |
| 2,866,001 | Smith | Dec. 23, 1958 |
| 2,996,579 | Slaymaker | Aug. 15, 1960 |

OTHER REFERENCES

The Analysis and Automatic Recognition of Speech Sounds by C. P. Smith, Electronic Engineering, August 1952, pages 368–372.

Signal Theory and Speech Transmission by E. E. David, Jr., IRE Transaction of Circuit Theory, vol. CT3, No. 4, December 1956, pages 232–243.

"A Survey of Speech Bandwidth Compression Technique," by S. J. Campanella, IRE Transactions on Audio, Sept.–Oct. 1958, page 110.

UNITED STATES PATENT OFFICE
CERTIFICATE OF CORRECTION

Patent No. 3,129,287 April 14, 1964

Raimo Bakis

It is hereby certified that error appears in the above numbered patent requiring correction and that the said Letters Patent should read as corrected below.

Column 5, lines 70 to 74, the equation should appear as shown below instead of as in the patent:

$$a_2 = \frac{\int_0^1 f(x)(1-6x+6x^2)dx}{1/5}$$

column 6, line 11, for "al" read -- $a_1$ --; column 9, line 73, for "$\alpha_1$" read -- $a_1$ --; column 10, line 9, for "1,60607" read -- 1.60607 --; line 10, for "$[\sigma_1(2)]^2$" read -- $[\hat{\sigma}_1(2)]^2$ --; same column 10, line 58, for "$\alpha_1$" read -- $\alpha_i$ --; column 12, lines 59 to 61, the structure should appear as shown below insted of as in the patent:

$$\frac{P_2}{P_{tot}}$$

line 67, for "$P_2/P_{t0t}$" read -- $P_2/P_{tot}$ --; column 14, line 5, for "generat" read -- generate --; column 15, line 41, for "($t_1$-0) read -- ($t_1$=0) --; line 46, for "postive" read -- positive --.

Signed and sealed this 12th day of January 1965.

(SEAL)
Attest:

ERNEST W. SWIDER
Attesting Officer

EDWARD J. BRENNER
Commissioner of Patents